US007603590B2

(12) United States Patent
Kaneda

(10) Patent No.: US 7,603,590 B2
(45) Date of Patent: Oct. 13, 2009

(54) INFORMATION PROCESSING APPARATUS AND NOTIFICATION METHOD THEREFOR, PROGRAM FOR IMPLEMENTING THE METHOD, AND STORAGE MEDIUM STORING THE PROGRAM

(75) Inventor: Takeshi Kaneda, Yokohama (JP)

(73) Assignee: Canon Kabushiki Kaisha (JP)

( * ) Notice: Subject to any disclaimer, the term of this patent is extended or adjusted under 35 U.S.C. 154(b) by 535 days.

(21) Appl. No.: 11/198,967

(22) Filed: Aug. 8, 2005

(65) Prior Publication Data

US 2006/0031906 A1 Feb. 9, 2006

(30) Foreign Application Priority Data

Aug. 6, 2004 (JP) ............................ 2004-231659

(51) Int. Cl.
*G06F 11/00* (2006.01)

(52) U.S. Cl. ............................ 714/48; 714/4; 358/1.14

(58) Field of Classification Search .................. 714/48, 714/4, 84
See application file for complete search history.

(56) References Cited

U.S. PATENT DOCUMENTS

| | | | | |
|---|---|---|---|---|
| 6,275,308 | B1 * | 8/2001 | Yoshida | 358/450 |
| 6,817,792 | B2 * | 11/2004 | Parry | 400/74 |
| 6,873,803 | B2 * | 3/2005 | Yogome et al. | 399/45 |
| 6,973,597 | B2 * | 12/2005 | Schroath et al. | 714/44 |
| 7,191,367 | B2 * | 3/2007 | Ito et al. | 714/47 |
| 7,266,734 | B2 * | 9/2007 | Chavez et al. | 714/48 |
| 2003/0112452 | A1 * | 6/2003 | McIntyre | 358/1.1 |
| 2004/0003076 | A1 * | 1/2004 | Hishimoto | 709/223 |
| 2004/0078683 | A1 * | 4/2004 | Buia et al. | 714/37 |
| 2004/0086284 | A1 * | 5/2004 | Endo | 399/10 |
| 2005/0286068 | A1 * | 12/2005 | Johnson et al. | 358/1.14 |
| 2006/0168569 | A1 * | 7/2006 | Smith et al. | 717/124 |

FOREIGN PATENT DOCUMENTS

| | | | |
|---|---|---|---|
| JP | 11-119607 | A | 4/1999 |
| JP | 11-202699 | A | 7/1999 |
| JP | 2003-271362 | A | 9/2003 |

OTHER PUBLICATIONS

Thomas R. Cikoski , Simple Network Management Protocol FAQ. Jul. 2, 2003.*
Don box, David Ehnebuske, Gopal Kakivaya, Andrew Layman . . . , Soap v1.1, May 8, 2000.*

* cited by examiner

*Primary Examiner*—Paul F. Contino
(74) *Attorney, Agent, or Firm*—Rossi, Kimms & McDowell LLP

(57) ABSTRACT

An information processing apparatus which is capable of notifying a management server of only necessary information for the management server to perform its proper maintenance function, as information on the maintenance of an image forming apparatus after recovery of the management server, to thereby avoid the management server from performing processing more than necessary. A device information transmission and retransmission schedule controller transmits maintenance information including status information and cumulative counter information on an image forming apparatus to an information collecting server. A retransmission data storage section stores the status information and the cumulative counter information. Upon recovery from failure in communication with the server, the schedule controller transmits the status information collected in a plurality of timings and part of the cumulative counter information collected in a plurality of timings to the server.

10 Claims, 22 Drawing Sheets

*FIG. 9*

```
<?xml version='1.0'?>
<env:Envelope                                   xmlns:env="http://schemas.xmlsoap.org/soap/envelope/"
env:encodingStyle="http//schemas.xmlsoap.org/soap/encoding/"
xmlns:xsl="http://www.w3.org/2001/XMLSchema-instance"       xmlns:xsd="http://www.w3.org/2001/XMLSchema"
xmlns:enc="http://schema.xmlsoap.org/soap/encoding/">
  <env:Body>
    <ns:postJamLog xmlns:ns="rdsgw">
      <jam_log_list xst:type="ns2:jamLogListType" xmlns:ns2="http://www.ABC.co.jp/active/eMaintenance">
        <device xsi:type="ns2:deviceIdentifyType" xmlns:ns2="http://www.ABC.co.jp/active/eMaintenance">
          <mac xsi:type="xsd:string">0000853dd0d5</mac>
          <ip xsi:type="xsd:string">172.24.177.24</ip>
          <serialNumber xsi:type="xsd:string">J28MT564</serialNumber>          701
          <productName xsi:type="xsd:string">iR2270/iR2870</productName>
          <type xsi:type="xsd:string">MFP</type>
        </device>
          <jam enc:arrayType="ns1:jamLogType[2]" xmlns:ns1="http://www.ABC.co.jp/active/eMaintenance"
xsi:type="enc:Array">
            <item xsi:type="ns2:jamLogType" xmlns:ns2="http://www.ABC.co.jp/active/eMaintenance">
              <className xsi:type="xsd:short">101</className>
              <occurrenceTime xsi:type="xsd:dateTime">2004-06-08T18:21:57.000Z</occurrenceTime>
              <revertState xsi:type="xsd:short">0</revertState>
              <totalResourceCount xsi:type="xsd:long">1677</totalResourceCount>
              <code xsi:type="xsd:long">257</code>                                  702
              <trayAlias xsi:type="xsd:short">255</trayAlias>
              <madiaType xsi:type="xsd:short>3</mediaType>
              <color xsi:type="xsd:short">255</color>
              <mediaSize xsi:type="xsd:short">0<mediaSize>
              <logNumber xsi:type="xsd:log>18</logNumber>
          </item>
        </jam>
      </jam_log_list>
    </ns:postJamLog>
  </env:Body>
</env:Envelope>
```

FIG. 10

```
<?xml version='1.0'?>
<env:Envelope                                    xmlns:env="http://schemas.xmlsoap.org/soap/envelope/"
env:encodingStyle="http//schemas.xmlsoap.org/soap/encoding/"
xmlns:xsl="http://www.w3.org/2001/XMLSchema-instance"     xmlns:xsd="http://www.w3.org/2001/XMLSchema"
xmlns:enc="http://schema.xmlsoap.org/soap/encoding/">
  <env:Body>
    <ns:postGlobalClickCount xmlns:ns="rdsgw">
      <clik_count_list                                      xsi:type="ns2:clickCountListType"
xmlns:ns2="http://www.ABC.co.jp/active/eMaintenance">
      <device xsi:type="ns2:deviceIdentifyType" xmlns:ns2="http://www.ABC.co.jp/active/eMaintenace">
        <mac xsi:type="xsd:string">0000853dd0d5</mac>
        <ip xsi:type="xsd:string">172.24.176.108</ip>
        <serialNumber xsi:type="xsd:string">J28MT564</serialNumber>
        <productName xsi:type="xsd:string">iR2270/iR2870</productName>
        <type xsi:type="xsd:string">MFP</type>
      <device>
      <timeStamp xsi:type="xsd:dataTime">2004-08T02:37:03.000Z</timeStamp>
    <cnt enc:anrrayType="ns1:string[50]" xmlns1="http://www.w3.org/2001/XMLSchema" xsi:type="enc:Array">
        <item xsi:type="xsd:string">505,23,2,2,3,1675</item>
        <item xsi:type="xsd:string">505.23.2,2,11,2363</item>
        <item xsi:type="xsd:string">505.15,2,4,2,0</item>
        <item xsi:type="xsd:string">505.15,2,3,2,11</item>
      </cnt>
     <//clik_count_list>
    </ns:postGlobalClikCount>
  </env:Body>
</env:Envelope>
```

```xml
<?xml version='1.0'?>
<env:Envelope
     xmlns:env="http://schemas.xmlsoap.org/soap/envelope/"
     env:endodngStyle="http://schemas.xmlsoap.org/soap/endcoding/"
     xmlns:xsi="http://www.w3.org/2001/XMLSchema-instance"
     xmlns:xsd="http://www.w3.org/2001/XMLSchema"
     xmlns:enc="http://schemas.xmlsoap.org/soap/endcoding/">
<env:Body>
<ns:postServiceCallLog xmlns:ns="rdsgw">
<service_call_log_list xsi:type="ns2:serviceCallLogListType" xmlns:ns2="http://www.ABC.co.jp/active/eMaintenance">
     <device xsi:type="ns2:deviceIdentityType" xmlns:ns2="http://www.ABC.co.jp/active/eMaintenance">
        <mac xsi:type="xsd:string">0000853dd0d5</mac>
        <ip xsi:type="xsd:string">172.24.177.24</ip>
        <serialNumber xsi:type="xsd:string">J28MT564</serialNumber>
        <productName xsi:type="xsd:string">iR2270/iR2870</productName>
        <type xsi:type="xsd:string">MFP</type>
     </device>
     <serviceCallLog enc:arrayType="ns1:serviceCallLogType[1]"
                    xmlns:ns1="http://www.ABC.co.jp/active/eMaintenance" xsi:type="enc:Array">
        <item xsi:type="ns2:servicCallLogType" xmlns:ns2="http://www.ABC.co.jp/active/eMaintenance">
           <className xsi:type="xsd:short">101</className>
           <occurrenceTime xsi:type="xsd:dateTime">2004-06-08T20:14:45.000Z</occurrenceTime>
           <revertState xsi:type="xsd:short">0</revertState>
           <totalResourceCount xsi:type="xsd:long">1677</totalResourceCount>
           <codetype xsi:type="xsd:long">1</codetype>
           <trayAlias xsi:type="xsd:short">255</trayAlias>
           <madiaType xsi:type="xsd:short>3</mediaType>
           <color xsi:type="xsd:long">1024</code>
           <subcode xsi:type="xsd:long">2</subcode>
           <logNumber xsi:type="xsd:log>17</logNumber>
        </item>
     </serviceCallLog>
   </service_call_log_list>
</ns:postServiceCallLog>
```

```
<?xml version='1.0'?>
<env:Envelope
        xmlns:env="http://schemas.xmlsoap.org/soap/envelope/"
        env:endodngStyle="http://schemas.xmlsoap.org/soap/endcoding/"
        xmlns:xsi=http://www.w3.org/2001/XMLSchema-instance
        xmlns:xsd="http://www.w3.org/2001/XMLSchema" xmln:enc="http://schemas.xmlsoap.org/soap/encodeing/">
<env:Body>
<ns:postAlert xmlns:ns="rdsgw">
   <alert_list xsi:type="ns2:alertListType" xmlns:ns2="http://www.ABC.co.jp/active/eMaintenance">
      <device xsi:type="ns2:deviceIdentityType" xmlns:ns2="http://www.ABC.co.jp/active/eMaintenance">
         <mac xsi:type="xsd:string">0000853dd0d5</mac>
         <ip xsi:type="xsd:string">172.24.176.108</ip>
         <serialNumber xsi:type="xsd:string">J28MT564</serialNumber>
         <productName xsi:type="xsd:string">iR2270/iR2870</productName>
         <type xsi:type="xsd:string">MFP</type>
      </device>
      <alert enc:arrayType="ns1:alertCodeType[6]" xmlns:ns1="http://www.ABC.co.jp/active/eMaintenance" xsi:type="enc:Array">
         <item xsi:type="ns2:alertCodeType" xmlns:ns2="http://www.ABC.co.jp/active/eMaintenance">
            <code xsi:type="xsd:long">50397185</code>
            <majorstatus xsi:type="xsd:int">4</majorstatus>
            <timeStamp xsi:type="xsd:dateTime">2004-06-08T05:17:43.000Z</timeStamp>
         </item>
      </alert>
    </alert_list>
  </ns:postAlert>
</env:Body>
</env:Envelope>
```

1001

1002

FIG. 17Ba
17-1 REGISTER (1) to (5)
IN RETRANSMISSION STANDBY LISTS
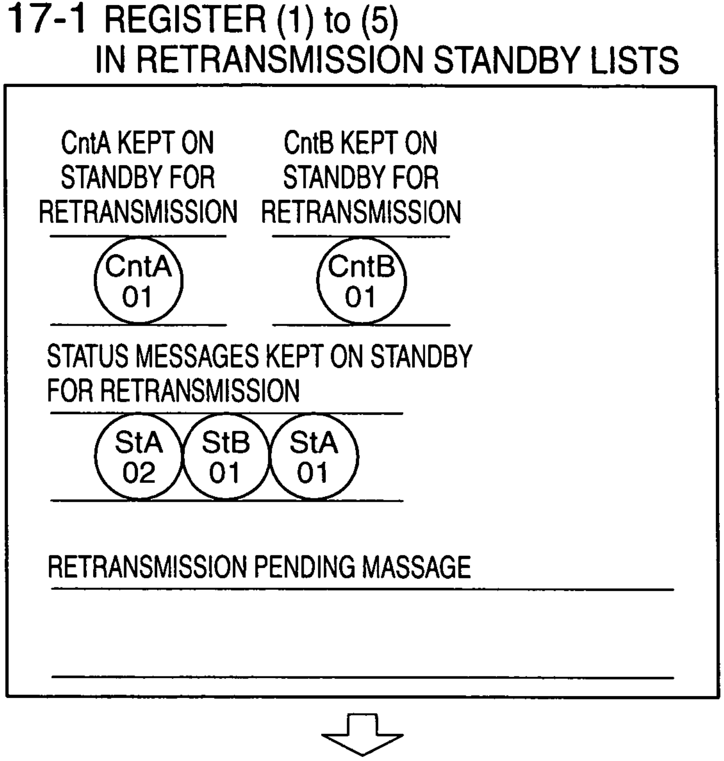
17-2 REGISTER (6) IN ASSOCIATED RETRANSMISSION
STANDBY LIST AND DELETE (1)
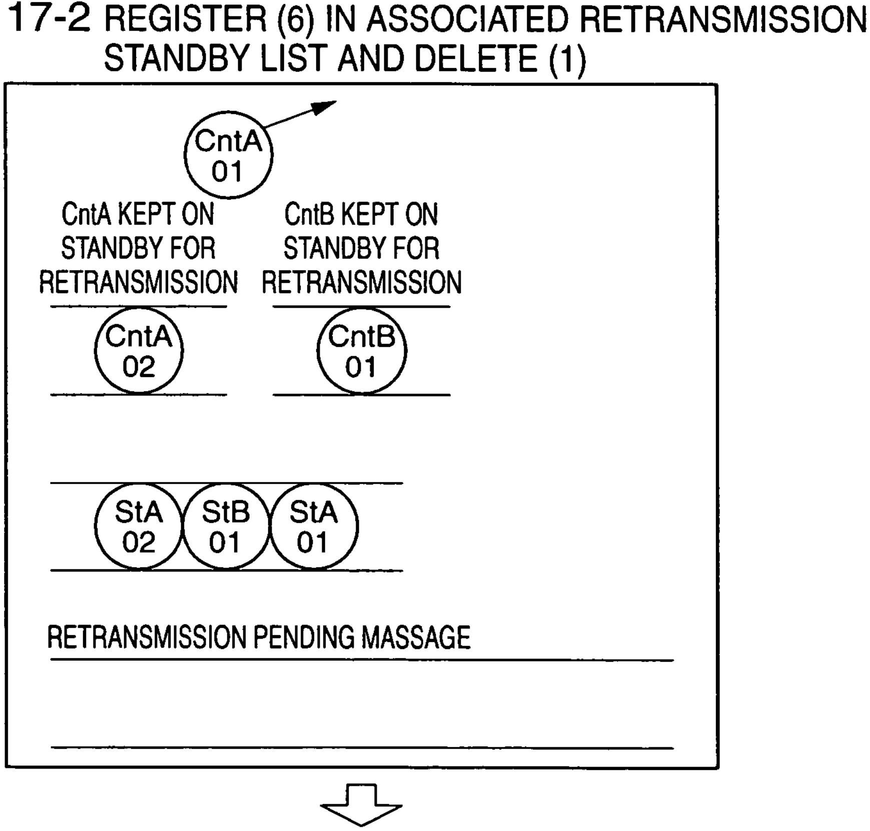
TO FIG.17Bb

FIG. 17Bb
17-3 MOVE (2) INTO RETRANSMISSION PENDING LIST AND REGISTER (7) IN ASSOCIATED RETRANSMISSION STANDBY LIST
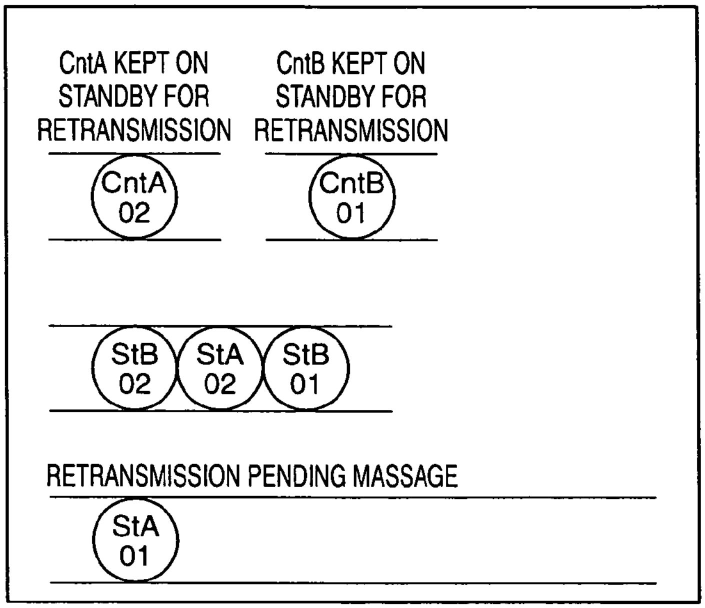
17-4 REGISTER (8) IN ASSOCIATED RETRANSMISSION STANDBY LIST AND DELETE (4)
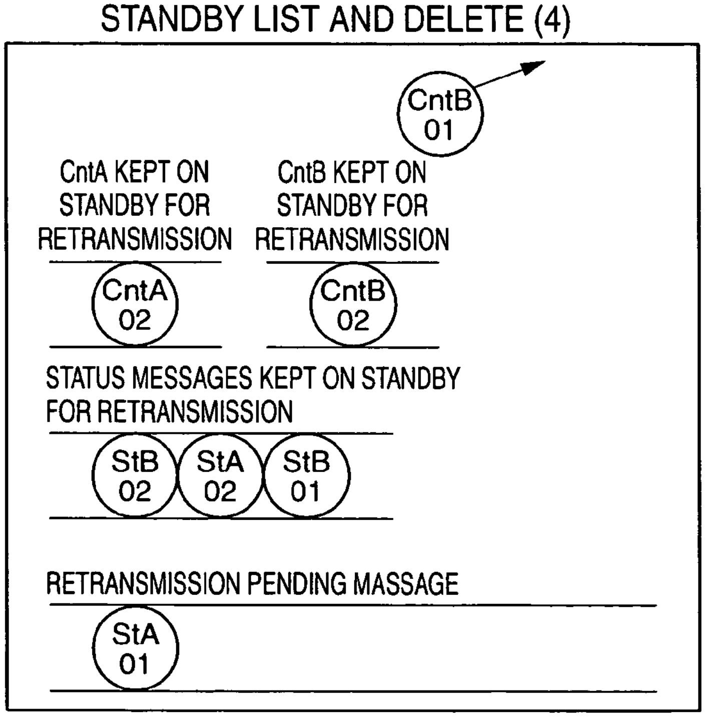
TO FIG.17Bc

FIG. 17Bc
17-5 MOVE (3) INTO RETRANSMISSION PENDING LIST AND REGISTER (9) IN ASSOCIATED RETRANSMISSION STANDBY LIST
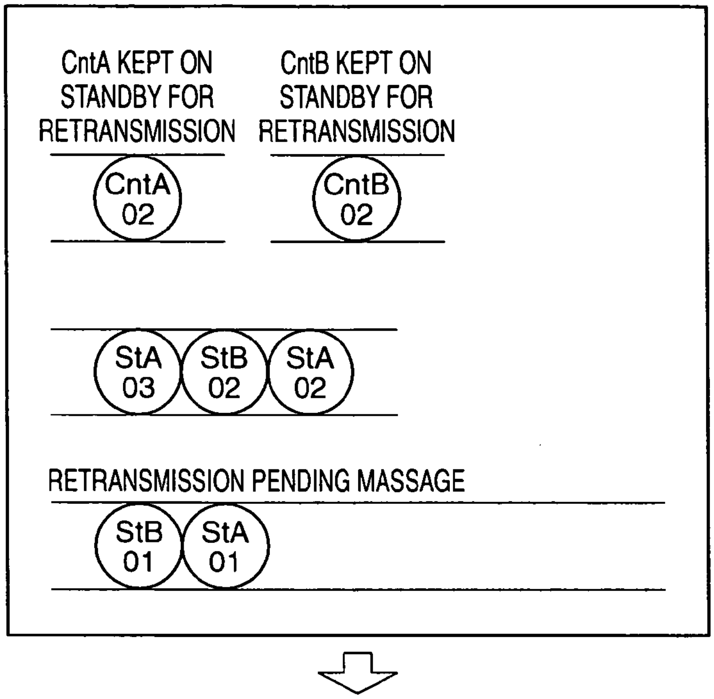
17-6 MOVE (5) INTO RETRANSMISSION PENDING LIST AND REGISTER (10) IN ASSOCIATED RETRANSMISSION STANDBY LIST
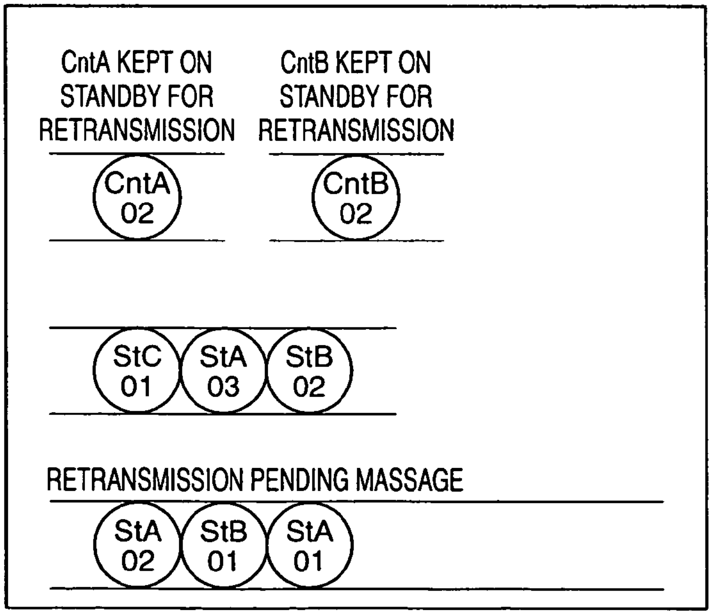

INFORMATION PROCESSING APPARATUS AND NOTIFICATION METHOD THEREFOR, PROGRAM FOR IMPLEMENTING THE METHOD, AND STORAGE MEDIUM STORING THE PROGRAM

BACKGROUND OF THE INVENTION

1. Field of the Invention

The present invention relates to an information processing apparatus provided with communication means for notifying maintenance information on an image forming apparatus to a management server, and a notification method therefor, as well as a program for implementing the notification method, and a storage medium storing the program.

2. Description of the Related Art

Conventionally, there has been proposed an image forming system including a plurality of image forming apparatuses, and a service center that performs centralized control of errors and the like of the image forming apparatuses (see e.g. Japanese Laid-Open Patent Publication (Kokai) No. H11-119607).

In the image forming system, an image forming apparatus itself or a communication apparatus connected to the image forming apparatus detects the status of the image forming apparatus, and sends information on trouble or the like of the image forming apparatus to the service center.

However, the conventional image forming system only notifies the detected status of an image forming apparatus to the service center in predetermined timing, but is not prepared for the case where the information cannot be notified due to occurrence of trouble in the service center or in a communication path.

In particular, after recovery of a server of the service center from trouble, messages from the image forming apparatuses managed by the service center arrive at the server concentratedly or simultaneously, and the server cannot always completely perform the reception processing.

To solve this problem, a method can be envisaged which uses a high-performance server which is capable of coping with concentrated or simultaneous arrival of messages from the managed image forming apparatuses. However, this method cannot be practically used because the server is very expensive.

SUMMARY OF THE INVENTION

It is an object of the present invention to provide an information processing apparatus which is capable of notifying a management server of only necessary information for the management server to perform its proper maintenance function, as information on the maintenance of an image forming apparatus after recovery of the management server, to thereby avoid the management server from performing processing more than necessary, and a notification method therefor, as well as a program for implementing the method, and a storage medium storing the program.

To attain the above object, in a first aspect of the present invention, there is provided an information processing apparatus that notifies maintenance information on at least one image forming apparatus to a management server, comprising a communication device that notifies the maintenance information including first maintenance information and second maintenance information on the image forming apparatus to the management server, a storage device that stores the first maintenance information and the second maintenance information, and a control device that is operable when failure in communication with the management server has been recovered, to cause the communication device to notify the first maintenance information collected in a plurality of timings and part of the second maintenance information collected in a plurality of timings to the management server.

Preferably, when the first maintenance information is generated during the failure in communication, the control device causes the first maintenance information to be additionally stored in the storage device, as an object to be notified, and when the second maintenance information is generated during the failure in communication, the control device deletes the second maintenance information stored in the storage device from objects to be notified and stores the second maintenance information generated anew in the storage device, as an object to be notified.

Preferably, the information processing apparatus comprises a registration control device that registers the second maintenance information in a transmission queue in a manner such that transmission of the second maintenance information is prioritized over transmission of the first maintenance information.

Preferably, the control device is responsive to a request from the management server for additional notification of the first maintenance information, for causing the communication device to notify the first maintenance information which has not been transmitted yet, to the management server.

Preferably, the control device is responsive to a request from the management server for notification of the first maintenance information and the second maintenance information, for notifying the first maintenance information and the second maintenance information to the management server according to SOAP (Simple Object Access Protocol).

Preferably, the first maintenance information is indicative of a status of the image forming apparatus, and the second maintenance information is counter information including an output face count in the image forming apparatus.

Preferably, the second maintenance information includes counter information indicative of a counter value counted up whenever a predetermined time period elapses without a predetermined function being used.

Preferably, the information processing apparatus comprises a printing apparatus that records an image on a recording medium.

To attain the above object, in a second aspect of the present invention, there is provided a notification method for an information processing apparatus including a communication device that notifies maintenance information including first maintenance information and second maintenance information on at least one image forming apparatus to a management server, comprising a storage step of storing the first maintenance information and the second maintenance information, and a control step of causing, upon recovery from failure in communication with the management server, the communication device to notify the first maintenance information collected in a plurality of timings and part of the second maintenance information collected in a plurality of timings to the management server.

To attain the above object, in a third aspect of the present invention, there is provided a program for causing a computer to execute a notification method for an information processing apparatus including a communication device that notifies maintenance information including first maintenance information and second maintenance information on at least one image forming apparatus to a management server, comprising a storage module for storing the first maintenance information and the second maintenance information, and a control module for causing, upon recovery from failure in communication with the management server, the communication device to notify the first maintenance information collected in a plurality of timings and part of the second maintenance information collected in a plurality of timings to the management server.

To attain the above object, in a fourth aspect of the present invention, there is provided a computer-readable storage medium storing a program for causing a computer to execute a notification method for an information processing apparatus including a communication device that notifies maintenance information including first maintenance information and second maintenance information on at least one image forming apparatus to a management server, the program comprising a storage module for storing the first maintenance information and the second maintenance information, and a control module for causing, upon recovery from failure in communication with the management server, the communication device to notify the first maintenance information collected in a plurality of timings and part of the second maintenance information collected in a plurality of timings to the management server.

According to the present invention, it is possible to avoid the management server from performing processing more than necessary, by notifying the management server of only necessary information for the management server to perform its proper maintenance function, as information on the maintenance of the image forming apparatus after recovery of the management server.

The above and other objects, features, and advantages of the invention will become more apparent from the following detailed description taken in conjunction with the accompanying drawings.

BRIEF DESCRIPTION OF THE DRAWINGS

FIG. 9 is a diagram showing an example of a SOAP/XML message for event notification, which is transmitted when a paper jam and recovery therefrom occurs;

FIG. 10 is a diagram showing an example of a SOAP/XML message used for notification of a cumulative counter value;

FIG. 11 is a diagram showing an example of a SOAP/XML message for event notification, which is transmitted when an event requiring services of a service person occurs;

FIG. 12 is a diagram showing an example of a SOAP/XML message for event notification, which is transmitted to the information collecting server when a warning is issued;

FIGS. 17A and 17Ba to 17Bc are diagrams useful in explaining how retransmission standby lists are updated when sequential transmission of pieces of status information and pieces of cumulative counter information is tried, but connection to the server fails, in which:

FIG. 17A illustrates a sequence of generation of the status information pieces and the cumulative counter information pieces; and FIGS. 17Ba to 17Bc illustrate how the retransmission standby lists are updated.

DETAILED DESCRIPTION OF THE PROFFERED EMBODIMENTS

The present invention will now be described in detail with reference to the drawings showing preferred embodiments thereof.

First, a description will be given of the system configuration of a first embodiment of the present invention.

Figure 1:
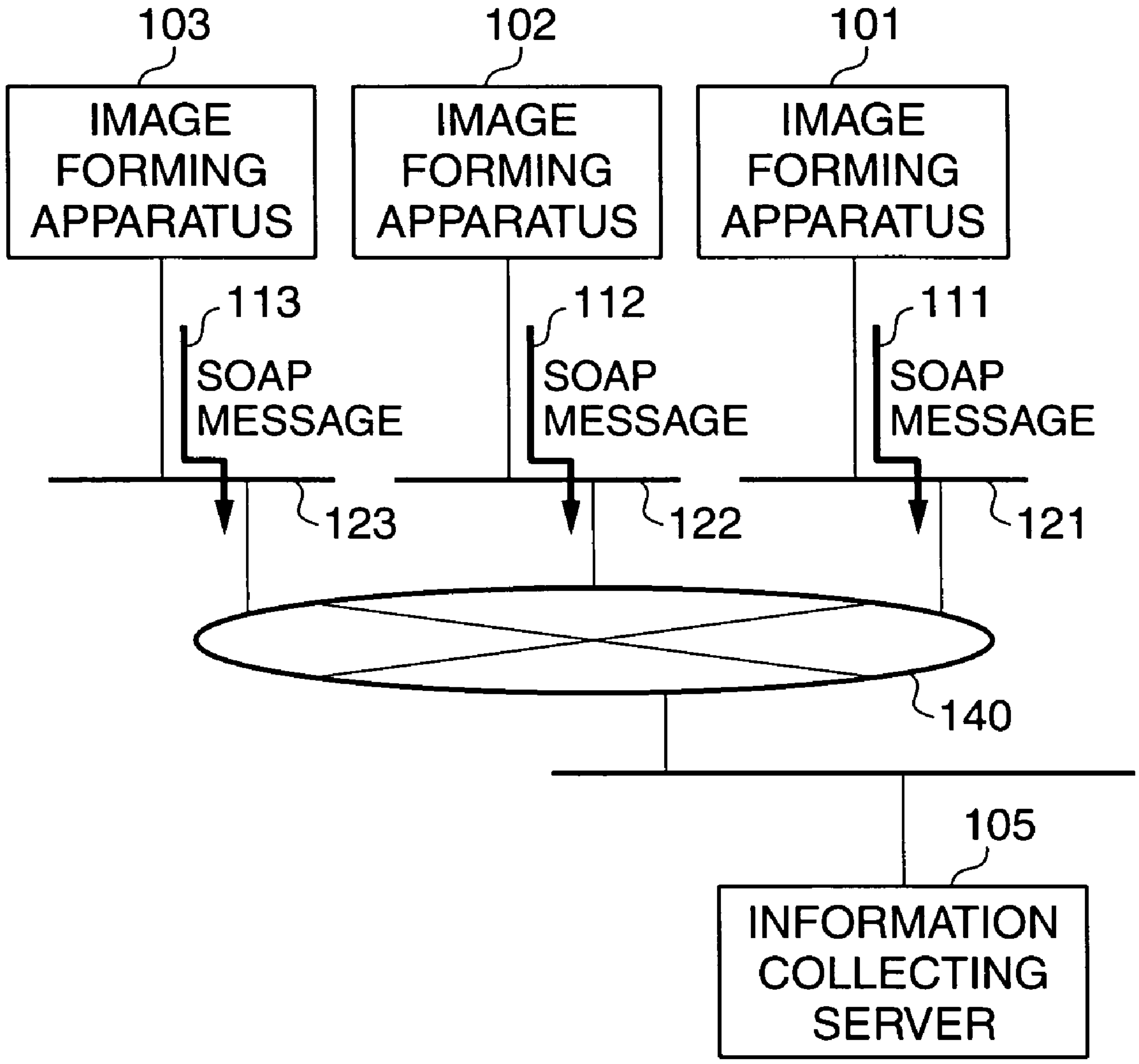
FIG. 1 is a diagram showing an example of the configuration of a network system comprised of image forming apparatuses each including an information processing apparatus according to a first embodiment of the present invention.

FIG. 1 is a diagram showing an example of the configuration of a network system comprised of image forming apparatuses each including an information processing apparatus according to the first embodiment.

In the network system of the present embodiment, the image forming apparatuses 101, 102, and 103 are connected to an information collecting server 105 via respective LANs 121, 122, and 123 associated therewith and the Internet 104. The information collecting server 105 collects operation information on the image forming apparatuses 101 to 103 in response to SOAP (Simple Object Access Protocol) messages 111, 112, and 113 received from the respective image forming apparatuses 101 to 103.

Next, a description will be given of the hardware configuration of the image forming apparatuses.

Figure 2:
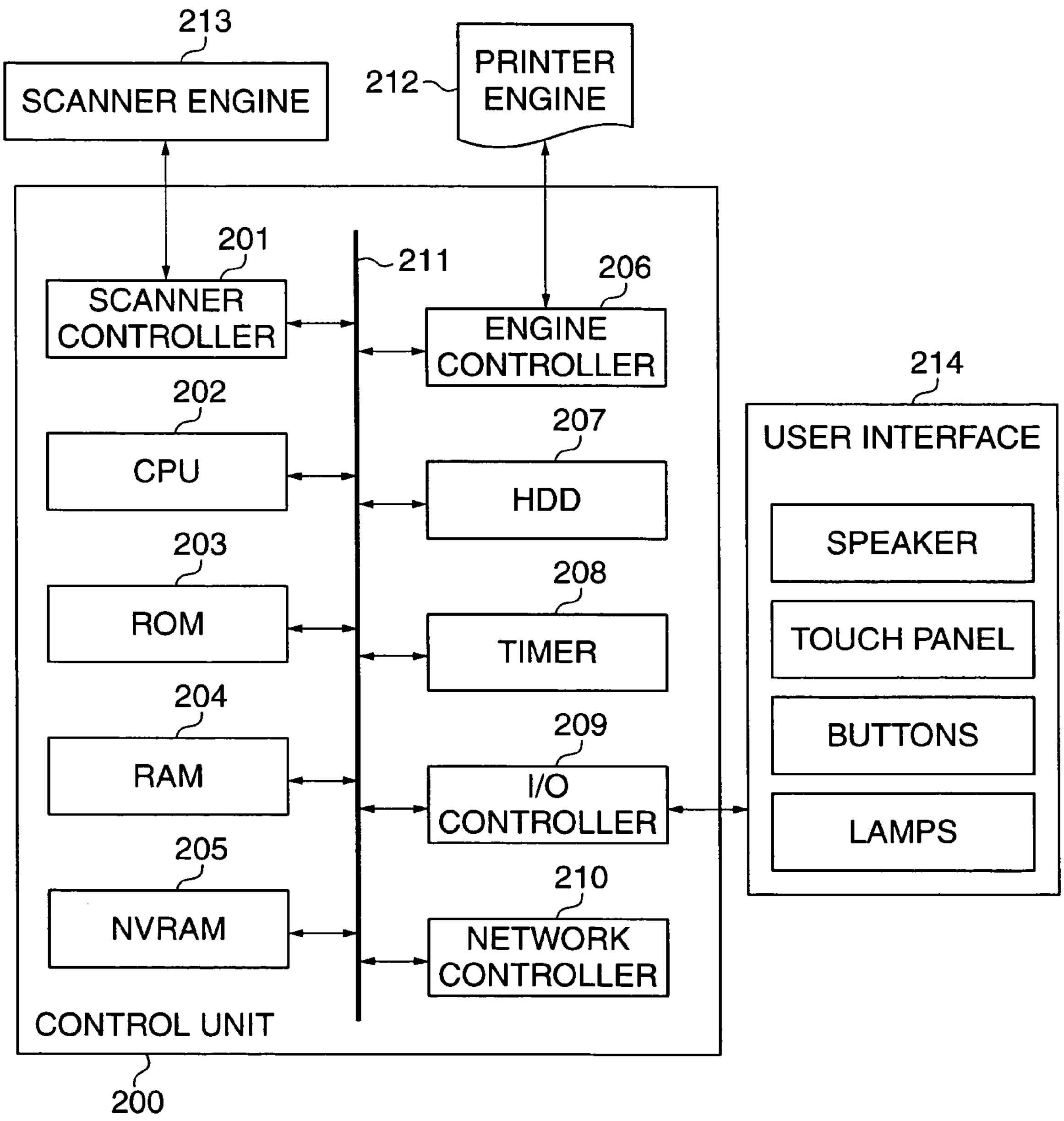
FIG. 2 is a block diagram schematically showing the hardware configuration of the image forming apparatuses appearing in FIG. 1.

FIG. 2 is a block diagram schematically showing the hardware configuration of each of the image forming apparatuses 101 to 103.

The image forming apparatuses 101 to 103 are each comprised of a control unit 200, a printer engine 212 as printing means for recording an image on a recording medium, a scanner engine 213, and a user interface 214.

The control unit 200 is comprised of a scanner controller 201, a CPU 202, a ROM 203, a RAM 204, a RAM (NVRAM) 205, an engine controller 206, a HDD 207, a timer 208, an I/O controller 209, and a network controller 210, each of which is connected to a bus 211.

The user interface 214 is comprised of a speaker, a touch panel, buttons, and lamps.

In the control unit 200, the scanner controller 201 controls the scanner engine 213, and the CPU 202 controls the overall operation of the apparatus. The RAM 204 functions as a work area for the CPU 202. The ROM 203 is a boot ROM storing a start-up program, etc. The RAM (NVRAM) 205 is a nonvolatile RAM that stores values set via the touch panel. The engine controller 206 controls the printer engine 212, and the HDD

207 stores application programs as well as various types of data including image data. The timer 208 governs timer functions. The I/O controller 209 controls the user interface 214, and the network controller 210 controls connection to the associated LAN.

Next, a description will be given of the configuration of operation information notification-related software of the image forming apparatuses.

Figure 3:
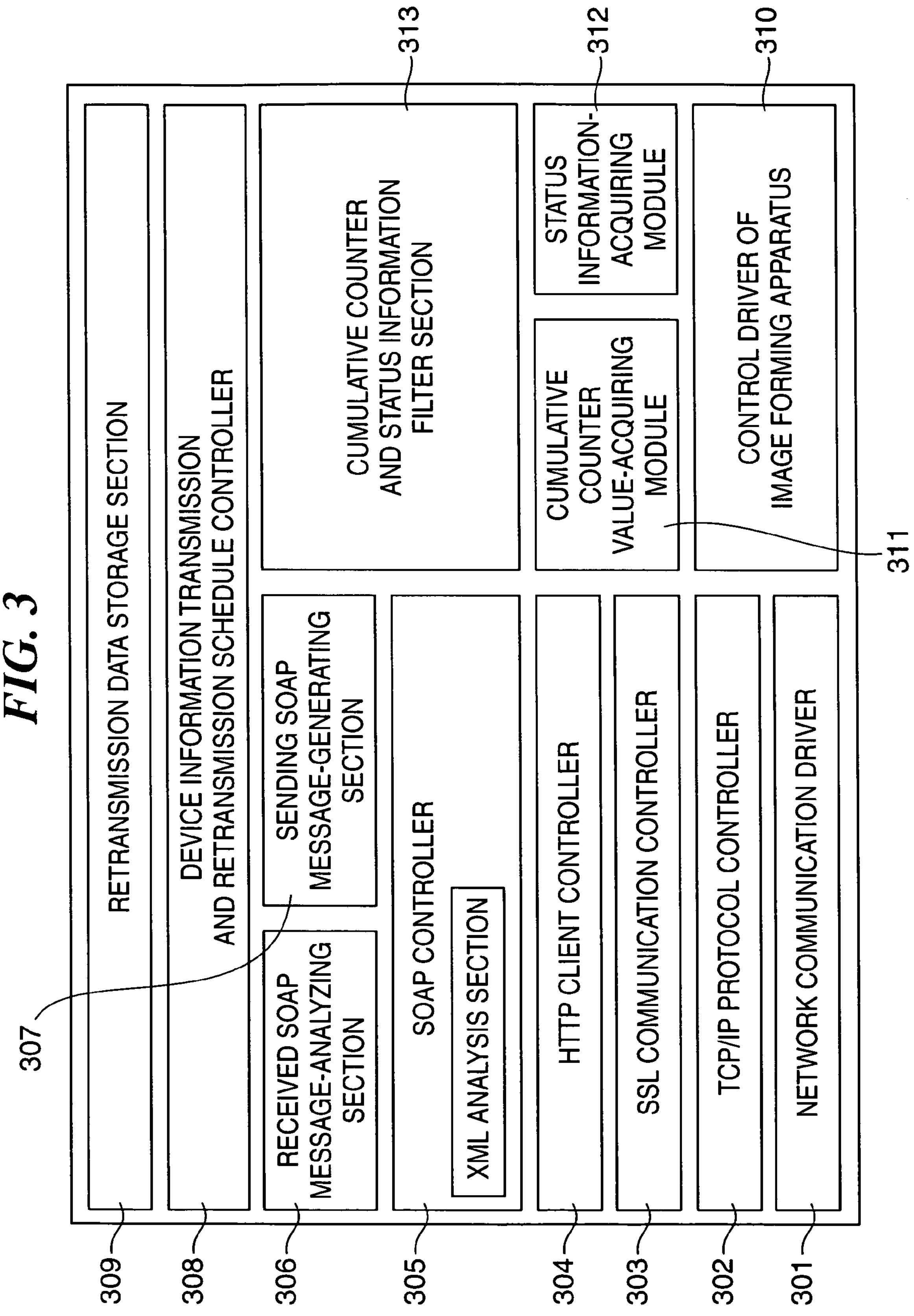
FIG. 3 is a diagram showing the configuration of operation information notification-related software of the image forming apparatuses in FIG. 1.

FIG. 3 is a diagram showing the configuration of the operation information notification-related software of each of the image forming apparatuses 101 to 103.

In FIG. 3, reference numeral 301 designates a network communication driver that controls a network interface. Reference numeral 302 designates a TCP/IP protocol controller that controls the overall TCP/IP communication. Reference numeral 303 designates a SSL communication controller that performs verification of a certificate associated with a connection destination, key exchange, and encoding and decoding of data, for communication. Reference numeral 304 designates a HTTP client controller that transmits and receives a SOAP message using the HTTP protocol, in response to a request from a SOAP controller 305.

The SOAP controller 305 incorporates a XML analysis section, and controls the SOAP communication. Reference numeral 306 designates a received SOAP message-analyzing section that analyzes contents of a response message from a communication destination. Reference numeral 307 designates a sending SOAP message-generating section that converts data in an associated device into a SOAP message. Reference numeral 308 designates a device information transmission and retransmission schedule controller that selects messages to be retransmitted, based on a process flow described hereinafter with reference to FIGS. 6 and 7. Reference numeral 309 designates a retransmission data storage section that stores SOAP messages determined to be put on standby or pending for retransmission.

Further, reference numeral 310 designates a control driver of the image forming apparatus. The control driver 310 controls the scanner controller 201 and the engine controller 206. Reference numeral 311 designates a cumulative counter value-acquiring module for collecting cumulative counter information from the scanner controller 201, the engine controller 206, etc.

The cumulative counter information (second maintenance information) is comprised of several tens to several hundreds of types of counter information, such as a cumulative copy count of the image forming apparatus, a cumulative output face count (each sheet is counted as one when subjected to single-sided printing, and as two when subjected to double-sided printing), and a cumulative operation time period from the start of operation of the image forming apparatus. The amount of the cumulative counter information is so large that not all the counter information is notified to the information collecting server 105, but only necessary ones are notified.

Reference numeral 312 designates a status information-acquiring module for collecting status information (first maintenance information) from the scanner controller 201, the engine controller 206, etc. As to a paper jam as an example of the status information, by obtaining the fact that the paper jam occurred, the fact that the cover was opened, and the fact that the jammed sheet was removed to resolve the trouble, as a sequence of changes with time in the status thereof, it is possible to grasp all the details of the paper jam. Therefore, as will be described hereinafter with reference to FIGS. 17A and 17Ba to 17Bc, while latest cumulative counter information excluding old information is registered for retransmission, status information including old status information is registered for retransmission so as to enable each sequence of statuses to be grasped. Reference numeral 313 designates a cumulative counter and status information filter section that filters unnecessary status changes off all status changes detected by the status information-acquiring module 312 and passes only necessary data to the transmission and retransmission schedule controller 308.

Further, as other types of counter information, there are recorded numerous optional types of counter information, such as cumulative counter information indicative of a counter value counted up whenever a predetermined time period elapses without a predetermined function (e.g. a box function for storing print data) being used, and information indicative of a printing system selected for use, a sheet size, a sheet count per each job, and the fact that a predetermined time period elapses without a predetermined function being used, for the purpose of grasping use conditions of the product (apparatus). These types of counter information, however, are not analyzed so as to obtain differences in respective cumulative values, and hence it is only required to obtain the latest counter values.

Next, a description will be given of the hardware configuration of the information collecting server.

Figure 4:
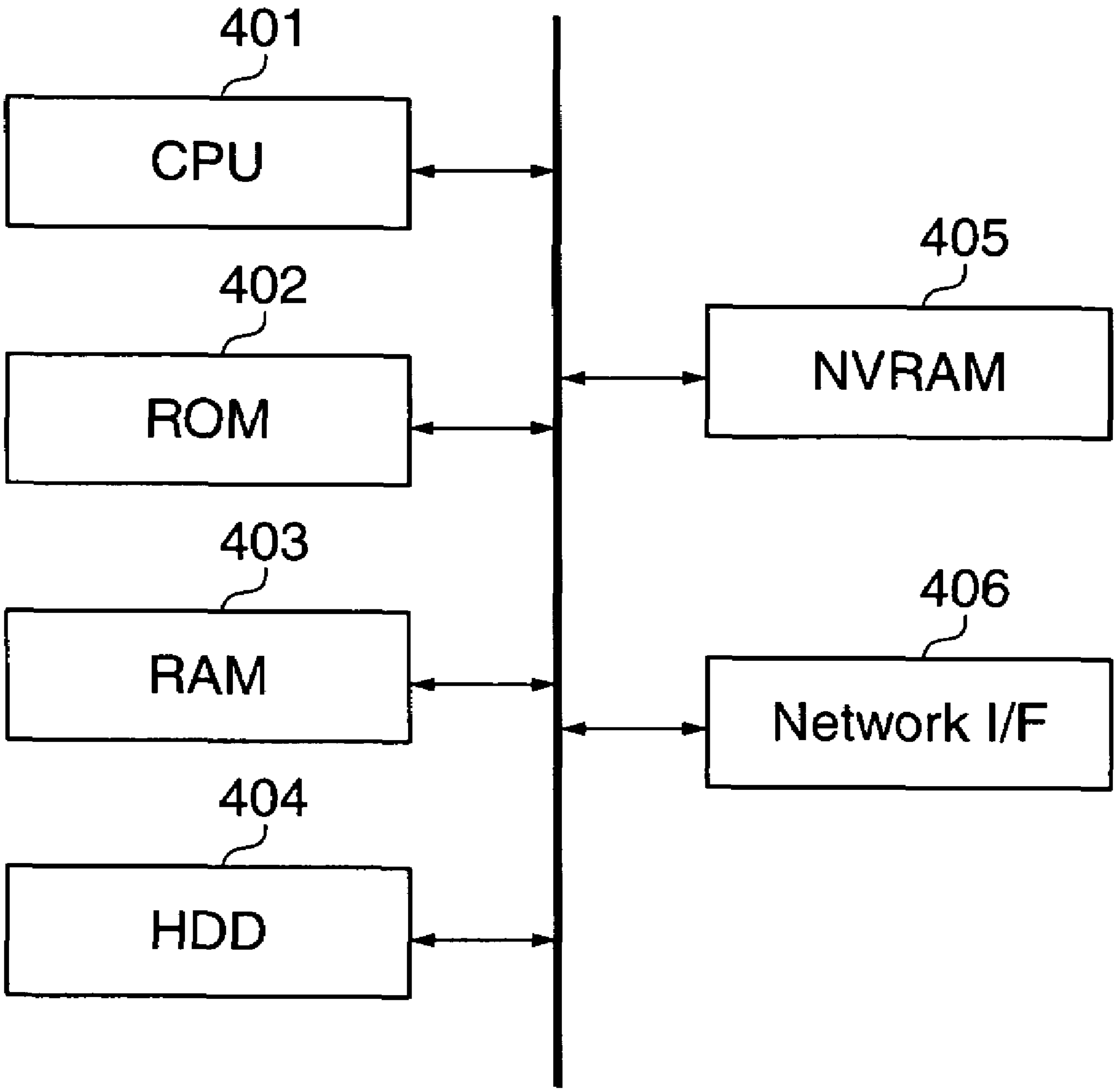
FIG. 4 is a block diagram showing the hardware configuration of an information collecting server appearing in FIG. 1.

FIG. 4 is a block diagram showing the hardware configuration of the information collecting server 105 appearing in FIG. 1.

The information collecting server 105 is comprised of a CPU 401, a ROM 402, a RAM 403, a HDD 404, a nonvolatile RAM (NVRAM) 405, and a network controller (network I/F) 406, each of which is connected to a bus 407.

The CPU 401 controls the overall operation of the server. The ROM 402 is a boot ROM storing a start-up program. The RAM 403 is used as an operation area or work area during operation of application software. The HDD 404 stores application programs and processed data, and the nonvolatile RAM (NVRAM) 405 stores information on basic settings. The network controller 406 controls connection to the network.

Next, a description will be given of the software configuration of the information collecting server.

Figure 5:
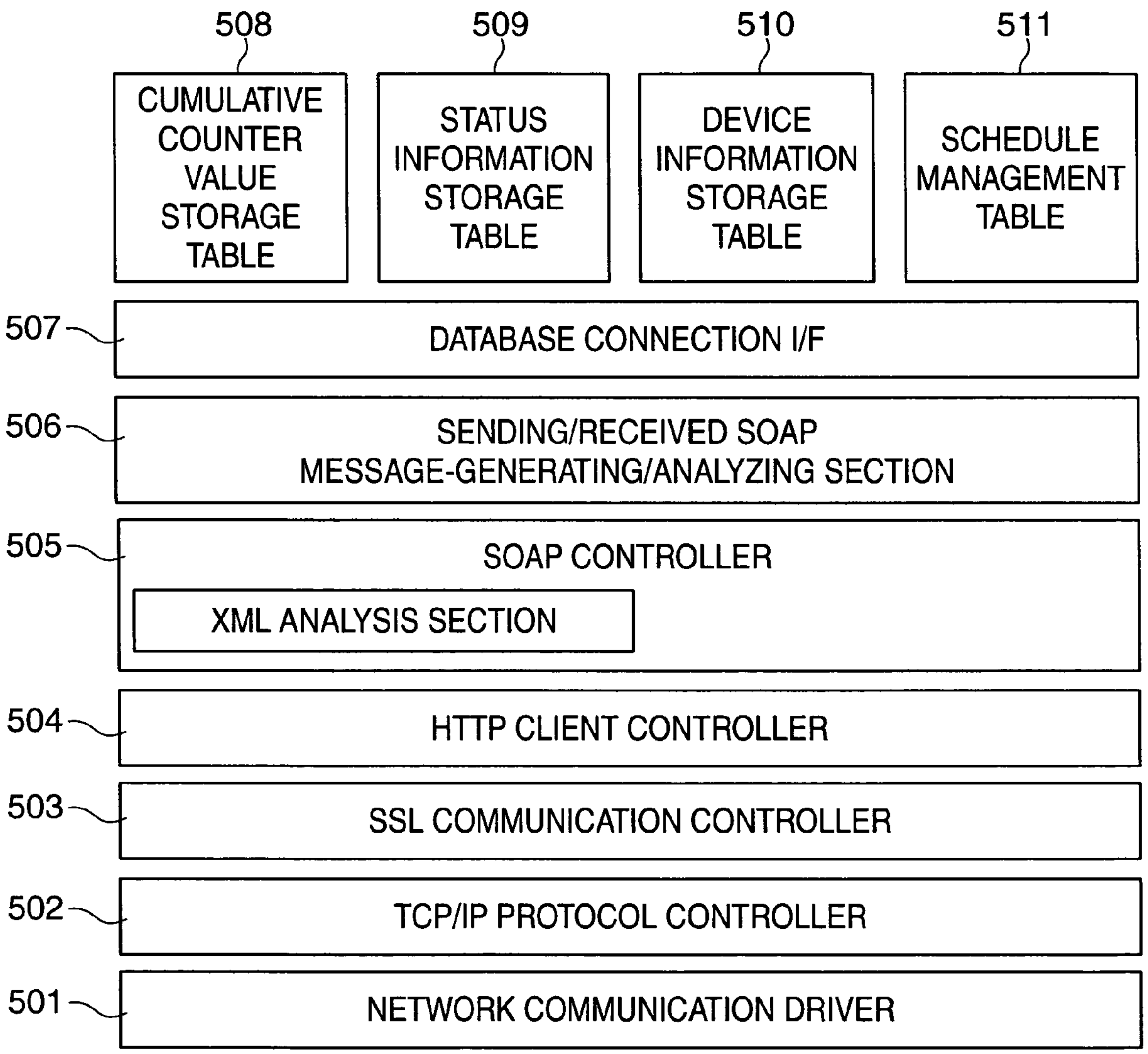
FIG. 5 is a diagram showing the software configuration of the information collecting server.

FIG. 5 is a block diagram showing the software configuration of the information collecting server 105.

In FIG. 5, reference numeral 501 designates a network communication driver that controls a network interface. Reference numeral 502 designates a TCP/IP protocol controller that controls the overall TCP/IP communication processing. Reference numeral 503 designates a SSL communication controller that performs verification of a certificate associated with a connection destination, key exchange, and encoding and decoding of data, for communication. Reference numeral 504 designates a HTTP client controller that transmits and receives a SOAP message using the HTTP protocol, in response to a request from a SOAP controller 505.

The SOAP controller 505 incorporates a XML analysis section, and controls the SOAP communication. Reference numeral 506 designates a sending/received SOAP message-generating/analyzing section that converts data in an associated device into a SOAP message or converts a received SOAP message into data having a format used in the device. Reference numeral 507 designates a database connection I/F that converts data taken from a received SOAP message into SQL data, and sends the data to a database comprised of tables 508 to 511, described below.

Reference numeral 508 designates a cumulative counter value storage table that stores cumulative counter values, and reference numeral 509 a status information storage table that stores status information. Reference numeral 510 designates a device information storage table that stores device information, and reference numeral 511 a schedule management table that stores information on device operation schedules. Updating and deletion of data in the tables 508 to 511 are executed via the database connection I/F 507.

In the following, a description will be given of operations characteristic of the image forming apparatuses configured as described above according to the first embodiment.

First, a description will be given of a retransmission process executed by the image forming apparatuses when the information collecting server goes down.

Figure 6:
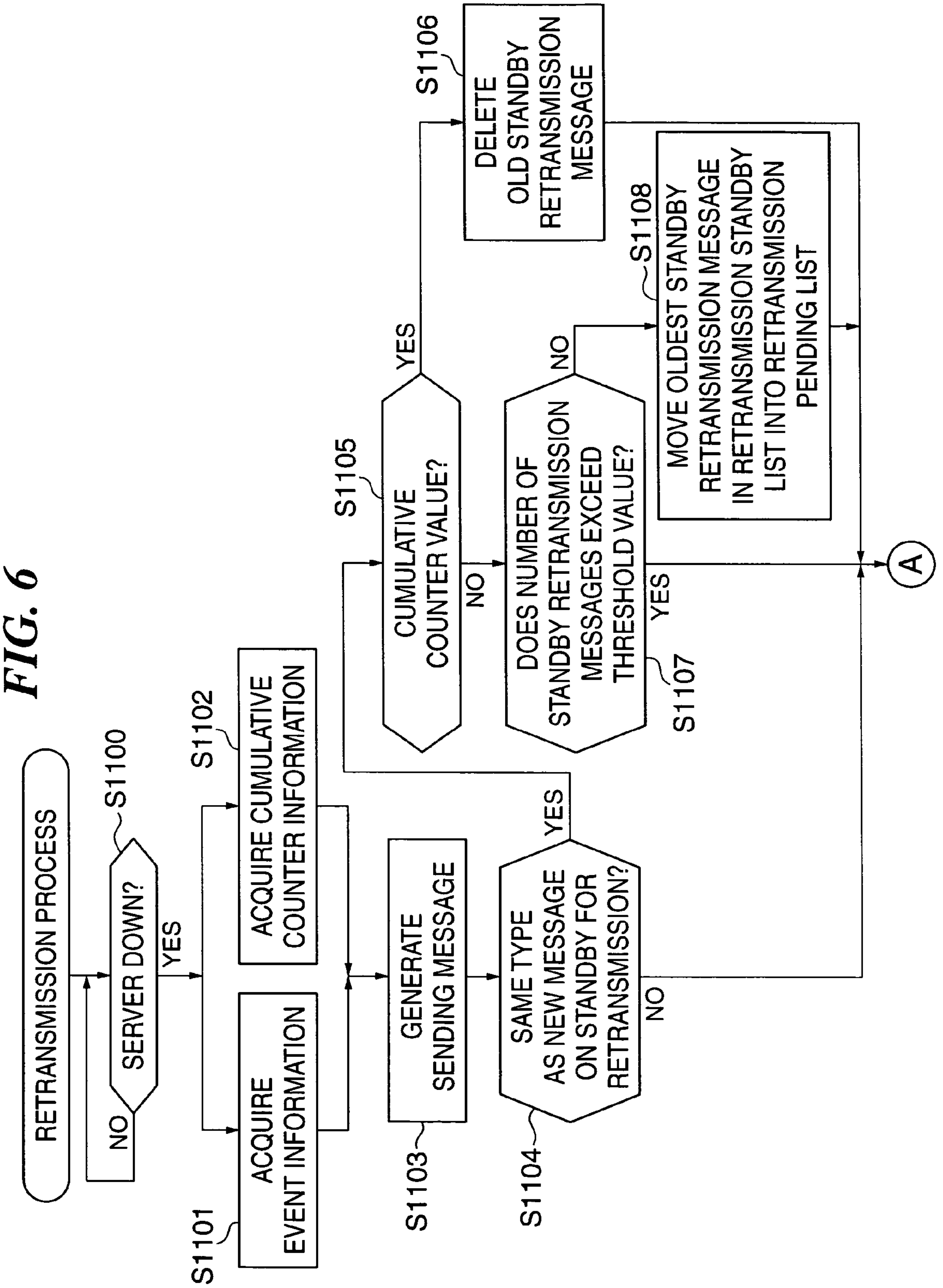
FIG. 6 is a flowchart showing a retransmission process executed by the image forming apparatus when the information collecting server goes down.
Figure 7:
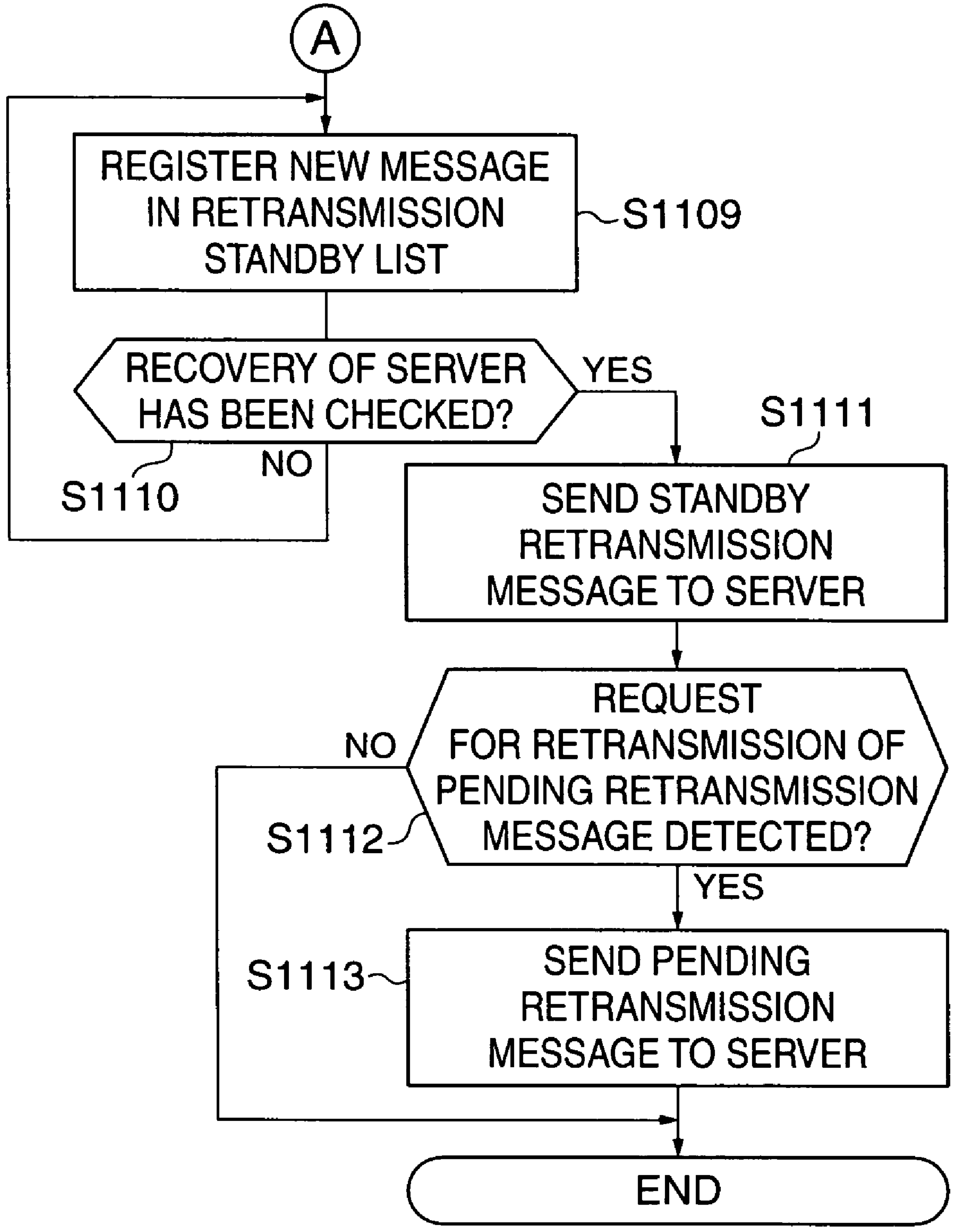
FIG. 7 is a continued part of the flowchart in FIG. 6.

FIGS. 6 and 7 are flowcharts showing the retransmission process executed by each of the image forming apparatuses 101 to 103 when the information collecting server 105 goes down.

First, in a step S1100, the transmission and retransmission schedule controller 308 determines whether or not the information collecting server 105 is down. When no response from a preset URL of the information collecting server 105 has been detected over a predetermined time period, e.g. 60 seconds, the transmission and retransmission schedule controller 308 determines that the information collecting server 105 is down.

In the next step S1101, the status information-acquiring module 312 acquires event information (status information), and in a step S1102, the cumulative counter value-acquiring module 311 acquires and stores cumulative counter information. Actually, each of the steps S1101 and S1102 is executed in a plurality of timings, and a plurality of pieces of status information and a plurality of pieces of cumulative counter information are collected.

Then, in a step S1103, the sending SOAP message-generating section 307 converts the information acquired in the step S1101 or S1102 into a SOAP message to thereby generate a sending message.

When the new sending message is generated, the transmission and retransmission schedule controller 308 checks in a step S1104 whether a message of the same type as the new message is kept on standby for retransmission in the retransmission data storage section 309. For example, it is checked whether or not cumulative copy counter information is kept on standby for retransmission.

If it is determined in the step S1104 that no message of the same type as the new message is kept on standby, the process proceeds to a step S1109, wherein the transmission and retransmission schedule controller 308 registers the generated new message as a standby retransmission message in an associated retransmission standby list in the retransmission data storage section 309. If it is determined in the step S1104 that a message of the same type as the new message is already registered, the process proceeds to a step S1105, wherein it is determined whether or not the registered message handles a cumulative counter value.

If it is determined in the step S1105 that the registered message handles a cumulative counter value, the process proceeds to a step S1106, wherein the transmission and retransmission schedule controller 308 deletes the existing old standby retransmission message (cumulative counter value) from the retransmission data storage section 309. Then, in the step S1109, the transmission and retransmission schedule controller 308 registers the cumulative counter value i.e. the new message with a higher priority in order of retransmission over the existing registered status information. This makes it possible to register the cumulative counter information in a transmission queue, with a higher priority over transmission of the status information, for preferential transmission of the cumulative counter information over the status information.

On the other hand, if it is determined in the step S1105 that the registered message does not handle a cumulative counter value, i.e. if it is determined that the registered message handles status information, the process proceeds to a step S1107, wherein the transmission and retransmission schedule controller 308 determines whether or not the number of pieces of registered status information of the same type which are kept on standby for retransmission in the retransmission data storage section 309 exceeds a threshold value. If the threshold value is not exceeded, the new message is kept on standby for retransmission in the retransmission data storage section 309 in the step S1109. If the threshold value is exceeded, the process proceeds to a step S1108, wherein the transmission and retransmission schedule controller 308 moves the oldest standby retransmission message in the associated retransmission standby list into a retransmission pending list. Then, in the step S1109, the transmission and retransmission schedule controller 308 registers the new message in the associated retransmission standby list.

After completion of the registration processing in the step S1109, the transmission and retransmission schedule controller 308 checks in a step S1110 whether or not the information collecting server 105 has recovered. Whether the information collecting server 105 has recovered is checked by performing retrial of transmission of information to the information collecting server 105 and determining from the result of the retrial whether the information collecting server 105 has restored the capability of communications.

If the information collecting server 105 has not recovered in the step S1110, the process returns to the step S1109, whereas if the information collecting server 105 has recovered, the process proceeds to a step S1111.

In the step S1111, the transmission and retransmission schedule controller 308 sends the standby retransmission message updated in the step S1106 or the standby retransmission messages updated in the step S1108 to the information collecting server 105 using the transmission queue to thereby notify the information collecting server 105 of first maintenance information (status information) collected in the plurality of timings and part of second maintenance information (cumulative counter information) collected in the plurality of timings.

Then, the process proceeds to a step S1112, wherein the transmission and retransmission schedule controller 308 checks whether or not a request for retransmission of pending retransmission messages has been received from the information collecting server 105, as a reply to the SOAP messages transmitted in the step S1111. If the request has been received, the pending retransmission messages are sent to the information collecting server 105 in a step S1113, followed by terminating the present process.

It should be noted that the steps S1107 and S1108 may be omitted. In this case, the information determined in the step S1105 to be a different type from the cumulative counter value may be directly registered in the associated retransmission standby list in the step S1109.

Figure 17A:
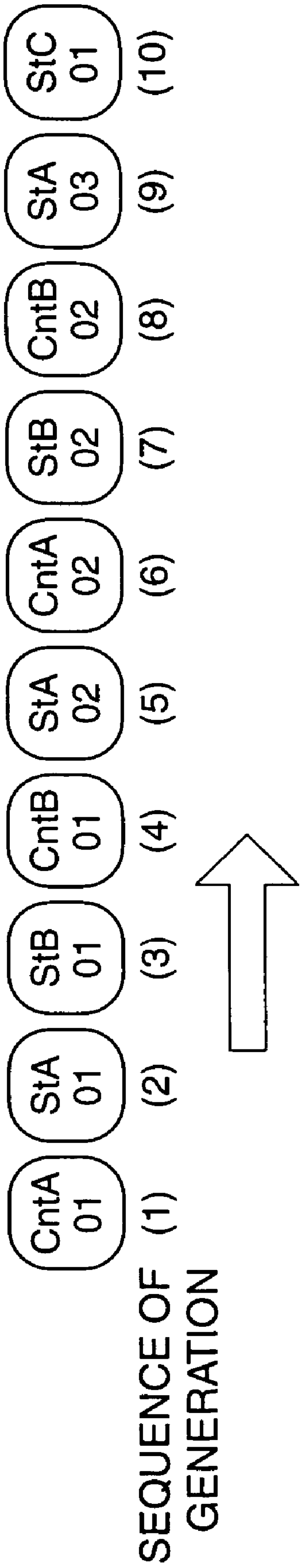

How messages are registered in the retransmission standby lists and the retransmission pending list in the process in FIGS. 6 and 7 is illustrated in FIGS. 17A and 17Ba to 17Bc. FIGS. 17A and 17Ba to 17Bc are diagrams useful in explaining how the retransmission standby lists are updated when sequential transmission of status information and cumulative counter information is tried, but connection to the server fails. FIG. 17A illustrates a sequence of generation of the status information and the cumulative counter information, and FIGS. 17Ba to 17Bc illustrate how the retransmission standby lists are updated.

In the following, a description will be given with reference to the retransmission standby lists, but the transmission queue may be provided with the function of the retransmission standby lists. Further, the cumulative counter information may be only one type of cumulative counter information, or alternatively a cumulative counter group of a plurality of types may be employed.

In the illustrated example, it is assumed that two types of cumulative counter information A and B and three types of status information A, B, and C are transmitted. Further, it is assumed that the cumulative counter information pieces A and B and the status information pieces A, B, and C are generated in the order shown in FIG. 17A. A piece of cumulative counter information A to be transmitted for the first time is represented by a symbol CntA01, and a piece of cumulative counter information A to be transmitted for the second time by a symbol CntA02. As to the status information classified into the three types A, B, and C, a piece of status information A to be transmitted for the first time is represented by a symbol StA01, for example. The cumulative counter information pieces A and B are acquired by collection processing in the step S1102, and the status information pieces A, B, and C are acquired by collection processing in the step S1101.

As shown in FIG. 17Ba, first, in a stage 17-1, sending messages (1) to (5) are each registered in an associated one of the transmission standby lists. More specifically, the cumulative counter information pieces are registered in a transmission standby list for cumulative counter information, and the status information pieces are registered in a transmission standby list for status information.

Next, in a stage 17-2, at a time point transmission of a message CntA02 (6) fails, the standby sending message CntA01 (1) as a cumulative counter information piece A is deleted (step S1106), and the message CntA02 (6) is registered anew (step S1109). In a stage 17-3, at a time point transmission of a message StB02 (7) fails, the message StA01 (2) is moved into the retransmission pending list (step S1108), and the message StB02 (7) is registered as a standby retransmission message (step S1109).

In a stage 17-4, at a time point transmission of a message CntB02 (8) fails, the message CntB01 (4) is deleted (step S1106), and the message CntB02 (8) is registered as a standby retransmission message (step S1109). In a stage 17-5, at a time point transmission of a message StA03 (9) fails, the message StB01 (3) is moved into the retransmission pending list (step S1108), and the message StA03 (9) is registered as a standby retransmission message (step S1109).

In a stage 17-6, at a time point transmission of a message StC01 (10) fails, the message StA02 (5) is moved into the retransmission pending list (step S1108), and the message StC02 (10) is registered as a standby retransmission message (step S1109).

Then, when connection to the information collecting server 105 becomes successful, the standby retransmission messages of the cumulative counter information pieces A and B and the status information pieces A, B, and C on standby for retransmission are sent to the information collecting server 105. Thereafter, if an additional request is received from the information collecting server 105, the status information pieces registered as pending retransmission messages are transmitted.

Next, a description will be given of a specific example of the retransmission process.

Figure 8A:
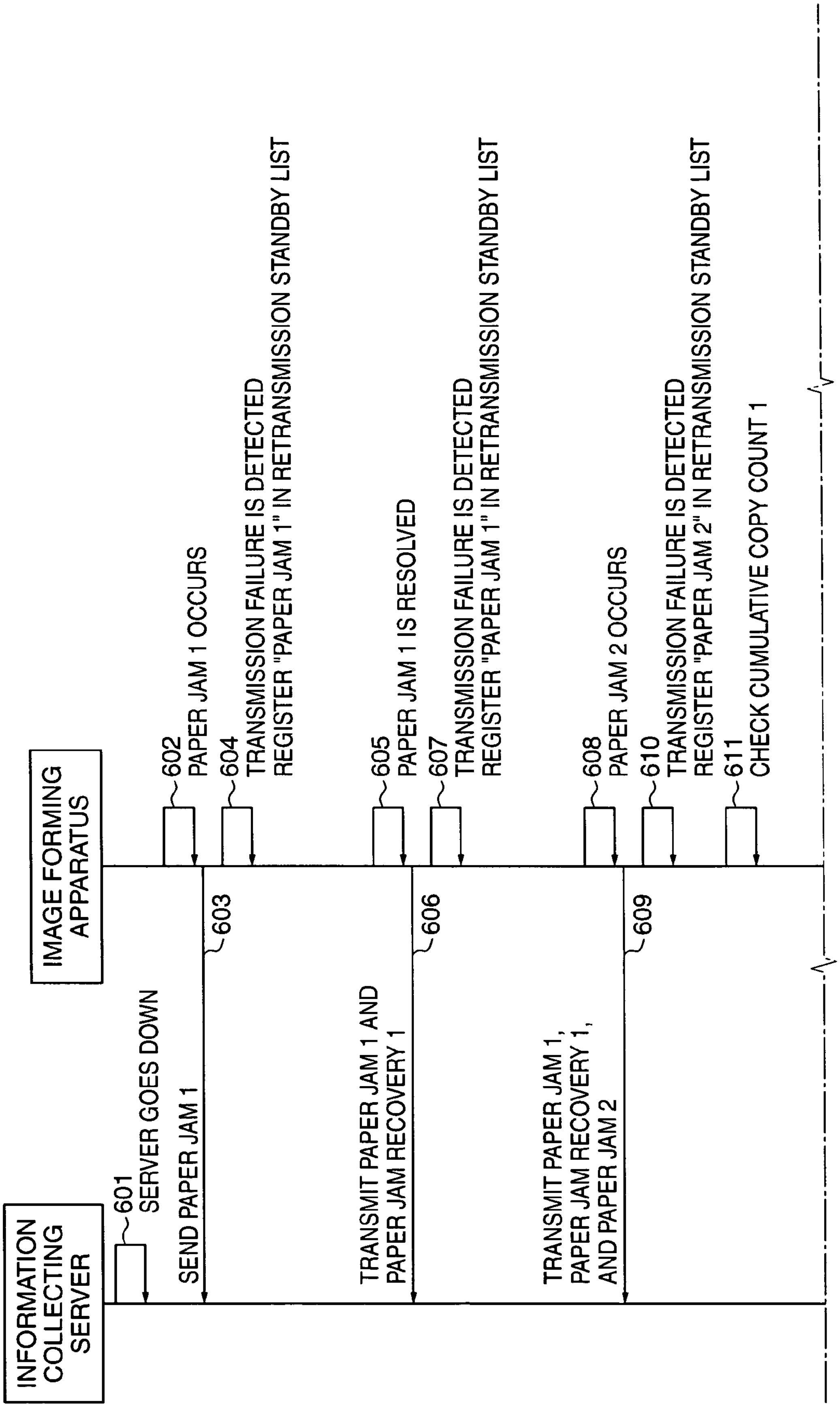
FIGS. 8A and 8B are sequence diagrams showing, by way of example, details of the retransmission process executed by the image forming apparatus.
Figure 8B:
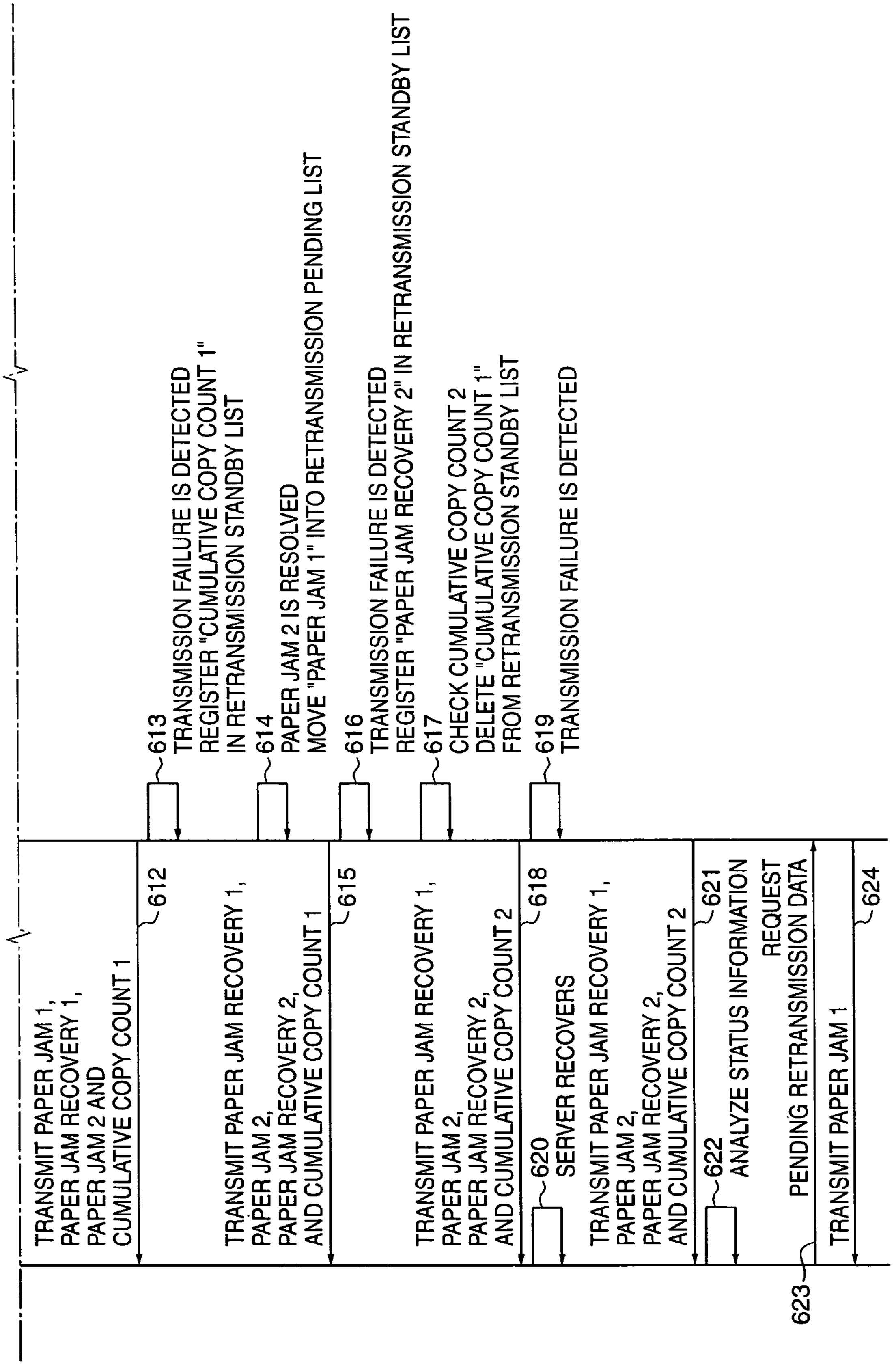

FIGS. 8A and 8B are sequence diagrams showing, by way of example, details of the retransmission process executed by each of the image forming apparatuses 101 to 103. This sequence shows the retransmission process executed by the image forming apparatus (e.g. 101) when transmission of status information indicative of a paper jam or a cumulative counter value indicative of a copy count or the like as a message to the information collecting server 105 is tried, but fails due to down of the information collecting server 105.

In the following, the sequence will be described in order from an event 601.

First, after the information collecting server 105 goes down in the event 601 (corresponding to the step S1100 in FIG. 6), a "paper jam 1" occurs in the image forming apparatus 101 (an event 602 corresponding to the step S1101), and transmission processing is carried out so as to send a status information piece "paper jam 1" to the information collecting server 105 (an event 603 corresponding to the step S1103). However, since the information collecting server 105 is down, the transmission processing fails, so that the status information piece "paper jam 1" is registered in a retransmission standby list (an event 604 corresponding to NO to the step S1104 and execution of the step S1109).

Thereafter, the image forming apparatus 101 recovers from the "paper jam 1" (an event 605 corresponding to the step S1101), and hence transmission processing is carried out so as to send a status information piece "paper jam recovery 1" to the information collecting server 105 together with the status information piece "paper jam 1" kept on standby for retransmission (an event 606 corresponding to the step S1103). At this time, the information collecting server 105 is still down similarly to the case of the immediately preceding transmission attempt, so that the transmission processing fails, and the status information piece "paper jam recovery 1" is registered in the retransmission standby list (an event 607 corresponding to YES to the step S1104, NO to the step S1105, YES to the step S1107, and execution of the S1109).

Thereafter, a "paper jam 2" occurs in the image forming apparatus 101 (an event 608 corresponding to the step S1101), and transmission processing is carried out so as to send a status information piece "paper jam 2" to the information collecting server 105 together with the status information pieces "paper jam 1" and "paper jam recovery 1" kept on standby for retransmission (an event 609 corresponding to the step S1103).

However, since the information collecting server 105 is still down, the transmission processing fails, and the information piece "paper jam 2" is registered in the retransmission standby list (an event 610 corresponding to YES to the step S1104, NO to the step S1105, YES to the step S1107, and execution of the step S1109).

Thereafter, a "cumulative copy count 1" is checked in the image forming apparatus 101 (an event 611 corresponding to the step S1102), and transmission processing is carried out so as to send the cumulative counter information piece "cumulative copy count 1" to the information collecting server 105 together with the status information pieces "paper jam 1", "paper jam recovery 1", and "paper jam 2" kept on standby for retransmission (an event 612 corresponding to the step S1103).

However, since the information collecting server 105 is still down, the transmission processing fails, and the information piece "cumulative copy count 1" is registered in the retransmission standby list (an event 613 corresponding to NO to the step S1104 and execution of the step S1109).

Thereafter, the image forming apparatus 101 recovers from "paper jam 2" (an event 614 corresponding to the step S1101), and hence transmission processing is carried out so as to send a status information piece "paper jam recovery 2" to the information collecting server 105 together with the status information pieces "paper jam recovery 1" and "paper jam 2" and the cumulative counter value "cumulative copy count 1" kept on standby for retransmission (an event 615 corresponding to the step S1103). At this time, the oldest status information piece "paper jam 1" in the retransmission standby list is moved into the retransmission pending list (an event 614 corresponding to YES to the step S1104, NO to the step S1105, NO to the step S1107 and execution of the step S1108), and hence transmission processing thereof is not carried out.

Since the information collecting server 105 is still down, the transmission processing in the event 615 fails, and the status information piece "paper jam recovery 2" is registered in the retransmission standby list (an event 616 corresponding to YES to the step S1104, NO to the step S1105, YES to the step S1107, and execution of the step S1109).

Thereafter, a "cumulative copy count 2" is checked in the image forming apparatus 101 (an event 617 corresponding to the step S1102), and transmission processing is carried out so as to send the cumulative counter value "cumulative copy count 2" to the information collecting server 105 together with the status information pieces "paper jam recovery 1", "paper jam 2", and "paper jam recovery 2" kept on standby for retransmission (an event 618 corresponding to the step S1103). At this time, the oldest cumulative counter value "cumulative copy count 1" in the retransmission standby list is deleted from the list (an event 617 corresponding to YES to the step S1104, YES to the step S1105, and execution of step S1106), and hence transmission processing thereof is not carried out. Since the information collecting server 105 is still down, failure of the transmission processing in the event 618 is detected (an event 619).

Then, when the information collecting server 105 recovers (an event 620 corresponding to the step S1110), the status information pieces "paper jam recovery 1", "paper jam 2", and "paper jam recovery 2", and the cumulative counter value "cumulative copy count 2" kept on standby for retransmission are sent to the information collecting server 105 (an event 621 corresponding to the step S1111). The information collecting server 105 analyzes the received status information (an event 622), and then requests transmission of pending retransmission data (an event 623 corresponding to the step S1112). When receiving the request, the image forming apparatus 101 sends the status information piece "paper jam 1" registered in the retransmission pending list to the information collecting server 105 (an event 624 corresponding to the step S1113).

In the sequence described above in detail, the image forming apparatus carries out transmission processing seven times in total (in the events 603, 606, 609, 612, 615, 618, and 621) between the down of the information collecting server 105 in the event 601 and the recovery of the same in the event 620. Further, preparation for transmission of the status information of a paper jam is made in each of the events 602, 605, 608, and 614, and preparation for transmission of a cumulative counter value is made in each of the events 611 and 617.

In the illustrated example, when the information collecting server 105 recovers, transmission message narrowing-down processing is executed based on the process flow shown in FIGS. 6 and 7 so that only the latest cumulative counter value and three status information pieces corresponding to three times counted from the first time can be sent to the information collecting server 105. More specifically, in the event 614, the first paper jam information (status information) piece "paper jam 1" is moved into the retransmission pending list, and in the event 617, transmission of the first cumulative counter value "cumulative copy count 1" is canceled. Thus, the amount of data transmitted immediately after the recovery of the information collecting server 105 is reduced.

The information collecting server 105 determines from the paper jam information pieces and the jam recovery information pieces in the events 608 and 614 that recovery from the latest paper jam has already been made and hence it is not necessary to send a service person urgently. However, the information collecting server 105 cannot determine how long the "paper jam 1" lasted until the recovery in the event 605, or whether or not the paper jams in the events 602 and 608 occurred in the same part of the image forming apparatus 101, for example. For this reason, when a predetermined time period has elapsed after the recovery of the information collecting server 105 and the traffic has stabilized, the information collecting server 105 requests retransmission of the pending retransmission data ("paper jam 1") in the event 623 so as to perform more precise analysis as to how the paper jams occurred.

In the following, SOAP/XML messages sent to the information collecting server 105 from the image forming apparatuses 101 to 103 in the above described retransmission process will be described.

First, a description will be given of a SOAP/XML message for notifying the information collecting server 105 of occurrence of or recovery from a paper jam.

FIG. 9 is a view showing an example of the event notification SOAP/XML message sent to the information collecting server 105 when an event of occurrence of or recovery from a paper jam occurs in any of the image forming apparatuses 101 to 103. This message corresponds to the messages generated in the steps S1101 and S1103 in FIG. 6.

A descriptive part 701 in FIG. 9 describes information for identifying a sender device (image forming apparatus), and stores a MAC address and an IP address of the device, a Key code for managing the device on a database, and so forth.

A descriptive part 702 in FIG. 9 stores the date and time of occurrence of or recovery from a paper jam, a jammed portion, a sheet type, and so forth in the device uniquely identified in the descriptive part 701. A character string <occurrenceTime> represents the date and time of jam occurrence, a character string <revertState> the state of jam recovery, a character string <revertTime> the time of jam recovery, a character string <totalResourceCount> a cumulative copy count at the time of the jam occurrence, and a character string <code> a detailed error code at the time of the jam occurrence.

Next, a description will be given of a SOAP/XML message for notifying the information collecting server 105 of a cumulative counter value.

FIG. 10 is a view showing an example of the SOAP/XML message used for notification of the cumulative counter value in the image forming apparatuses 101 to 103. This message corresponds to the messages generated in the steps S1102 and S1103 in FIG. 6.

A descriptive part 801 in FIG. 10 describes information for identifying a sender device, and stores a MAC address and an IP address of the device, a code for managing the device on a database, and so forth.

A descriptive part 802 in FIG. 10 stores types of cumulative counters in the device uniquely identified in the descriptive part 801 and count values (cumulative counter values) of the counters. The cumulative counter values are listed as array elements of <String> in <item> in the descriptive part 802. For example, in the first item of the array elements, <505, 23, 2, 2, 3> is a code for identifying a counter, and <1675> is a cumulative value of the counter identified by <505, 23, 2, 2, 3>.

Next, a description will be given of SOAP/XML messages for notifying the information collecting server 105 of other events.

In the above description of the retransmission process (FIGS. 8A and 8B), only paper jam occurrence and paper jam recovery are taken as examples of status information (event information) to be retransmitted from the image forming apparatus, but it is understood that other event information can be retransmitted. The retransmittable event information includes an event (service call error) requiring services of a service person, and event information, such as occurrence of a warning e.g. to the effect that "the body cover is left open". In the following, examples of SOAP/XML messages used for notification of such event information will be described with reference to FIGS. 11 and 12.

FIG. 11 is a view showing an example of the event notification SOAP/XML message sent to the information collecting server 105 when an event requiring services of a service person occurs in any of the image forming apparatuses 101 to 103. This message corresponds to the messages generated in the steps S1101 and S1103 in FIG. 6.

A descriptive part 901 in FIG. 11 describes information for identifying a sender device (image forming apparatus), and stores a MAC address and an IP address of the device, a Key code for managing the device on a database, and so forth.

A descriptive part 902 in FIG. 11 describes information of a service call error which has occurred in the device uniquely identified in the descriptive part 901. Here, the information collecting server 105 can understand, from <code> and <sub-code> within <serviceCallLog> tags, that a trouble No. 1024-0002 (e.g. disconnection of a cable) has occurred. Prior information of breakage of a drum unit, a scanner sensor, or the like, which is useful for troubleshooting by a service person, is provided using the <code> and the <sub-code>.

FIG. 12 is a view showing an example of the event notification SOAP/XML message sent to the information collecting server 105 when a warning e.g. to the effect that "the body cover is left open" is issued in any of the image forming apparatuses 101 to 103. This message corresponds to the messages generated in the steps S1101 and S1103 in FIG. 6.

A descriptive part 1001 in FIG. 12 describes information for identifying a sender device, and stores a MAC address and an IP address of the device, a code for managing the device on a database, and so forth. In a descriptive part 1002, the details of a warning issued by the device uniquely identified in the descriptive part 1001 are written in <code>, and the type of the warning in <majorstatus>. In <timestamp> is written a time when the event occurred.

Next, a description will be given of the system configuration of a second embodiment of the present invention.

Figure 13:
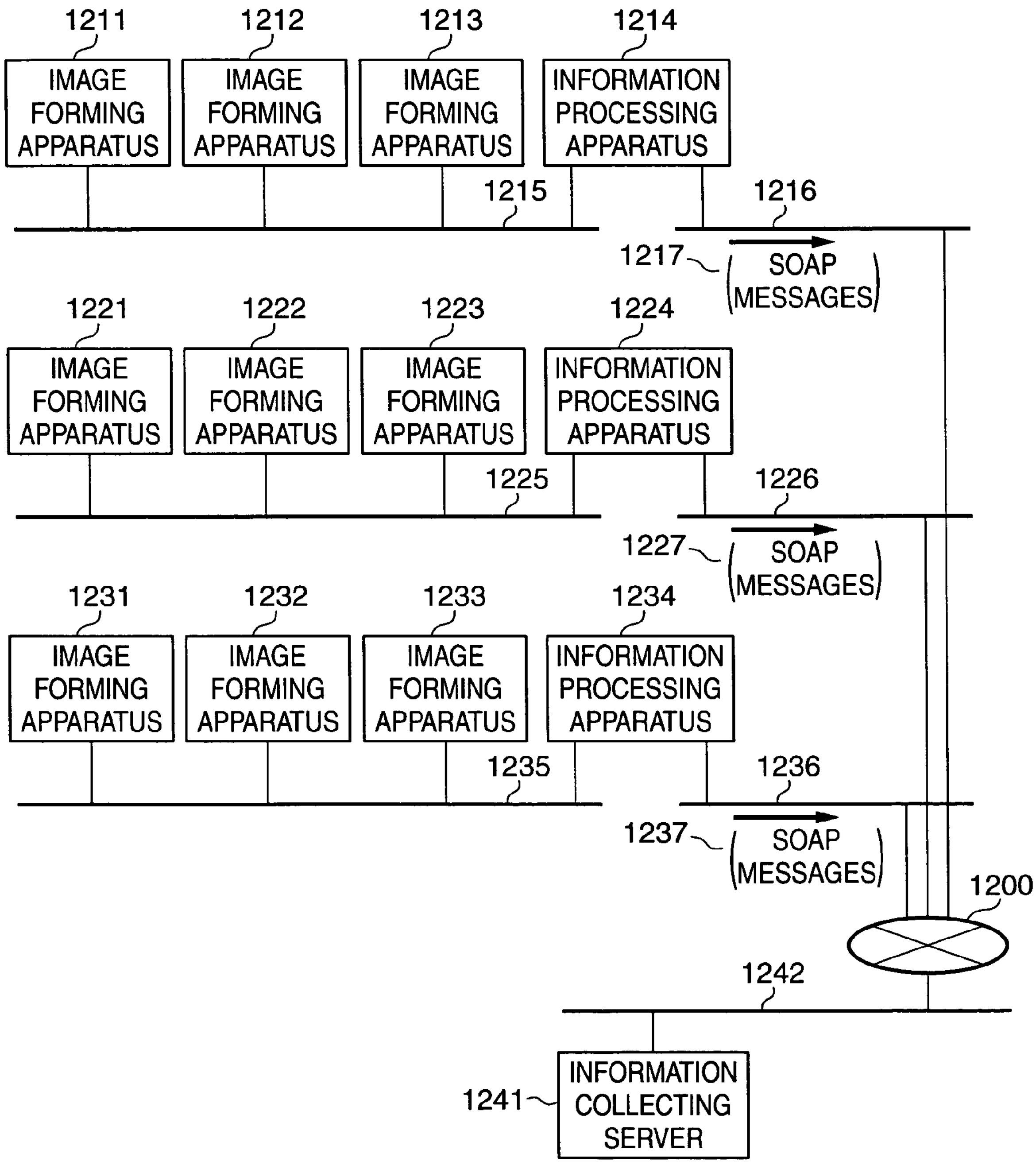
FIG. 13 is a diagram showing an example of the configuration of a network system including information processing apparatuses according to a second embodiment of the present invention.

FIG. 13 is a diagram showing an example of the configuration of a network system including information processing apparatuses according to the second embodiment.

In the present embodiment, each of a plurality of information processing apparatuses collects operation information from a plurality of image forming apparatuses as objects to be monitored by the information processing apparatus, and sends SOAP messages to an information collecting server on behalf of the image forming apparatuses.

More specifically, an information processing apparatus 1214 collects operation information from image forming apparatuses 1211, 1212, and 1213 to be monitored thereby, through a LAN 1215 associated therewith, and sends SOAP messages 1217 to the information collecting server 1241 via a network 1216 connected to the Internet 1200.

Similarly to the information processing apparatus 1214, information processing apparatuses 1224 and 1234 acquire operation information from image forming apparatuses 1221 to 1223 monitored by the information processing apparatus 1224 and image forming apparatuses 1231 to 1233 monitored by the information processing apparatus 1234, respectively, and each of the information processing apparatuses 1224 and 1234 sends SOAP messages 1227 or 1237 to the information collecting server 1241.

As in the first embodiment, information to be transmitted includes cumulative counter values and device status information, and the SOAP messages to be transmitted have the same formats as those shown in FIGS. 9 and 10. The present embodiment is distinguished from the first embodiment in that each of the information processing apparatuses 1214, 1224, and 1234 periodically collects status information and cumulative counter values from the associated image forming apparatuses.

The hardware configuration of each of the information processing apparatuses 1214, 1224, and 1234 is the same as that shown in FIG. 4, and hence description thereof is omitted.

Next, a description will be given of the software configuration of the information processing apparatus.

Figure 14:
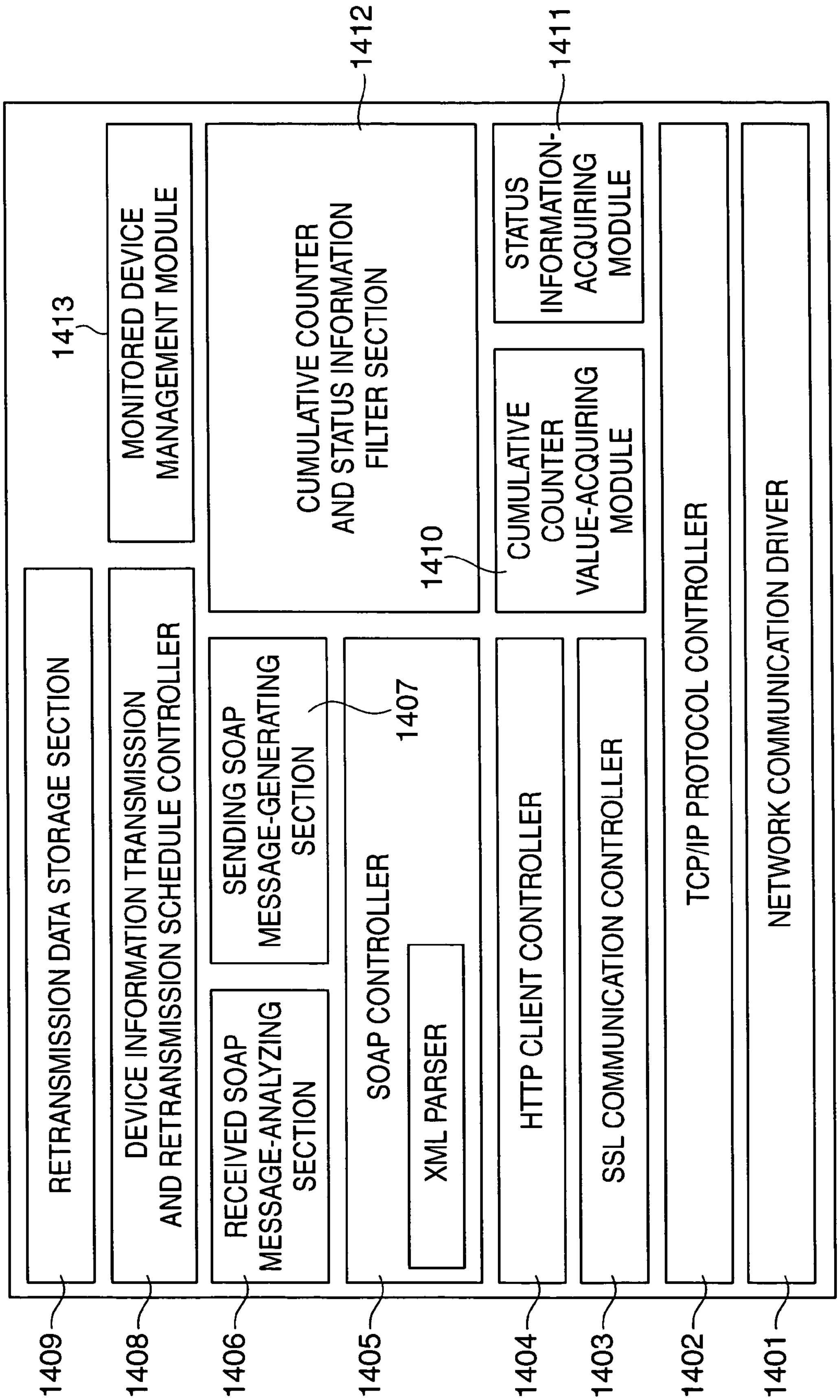
FIG. 14 is a diagram showing the software configuration of the information processing apparatuses of the second embodiment.

FIG. 14 is a diagram showing the software configuration of each of the information processing apparatuses 1214, 1224, and 1234.

In FIG. 14, reference numeral 1401 designates a network communication driver that controls a network interface. Reference numeral 1402 designates a TCP/IP protocol controller that controls the overall TCP/IP communication. Reference numeral 1403 designates a SSL communication controller that performs verification of a certificate associated with a connection destination, key exchange, and encoding and decoding of data, for communication.

Reference numeral 1404 designates a HTTP client controller that transmits and receives a SOAP message using the HTTP protocol, in response to a request from a SOAP controller 1405. The SOAP controller 1405 incorporates a XML parser and controls the SOAP communication. Reference numeral 1406 designates a received SOAP message-analyzing section that analyzes the contents of a response message from the information collecting server 1241. Reference numeral 1407 designates a sending SOAP message-generating section that converts data acquired from each of the associated image forming apparatuses into SOAP messages.

Reference numeral 1408 designates an operation information transmission and retransmission schedule controller that selects messages to be retransmitted, based on the same process flow as described hereinabove with reference to FIGS. 6 and 7. Reference numeral 1409 designates a retransmission data storage section that stores SOAP messages determined to be put on standby or pending for retransmission by the transmission and retransmission schedule controller 1408.

Reference numeral 1410 designates a cumulative counter value-acquiring module that collects cumulative counter information from the scanner controller 201 and the engine controller 206 of each of the associated image forming apparatuses. Reference numeral 1411 designates a status information-acquiring module that collects status information from the scanner controller 201, the engine controller 206, etc.

Reference numeral 1412 designates a cumulative counter and status information filter section that filters unnecessary status changes off all status changes detected by the status information-acquiring module 1411 and then passes only necessary data to the transmission and retransmission schedule controller 1408.

Reference numeral 1413 designates a monitored device management module that stores data of the image forming apparatuses to be monitored. The information processing apparatus acquires data from each of the image forming apparatuses via the information acquisition module 1410 or 1411, and converts the data into SOAP messages, followed by sending the SOAP messages to the information collecting server 1241.

Next, a description will be given of the software configuration of the image forming apparatus.

Figure 15:
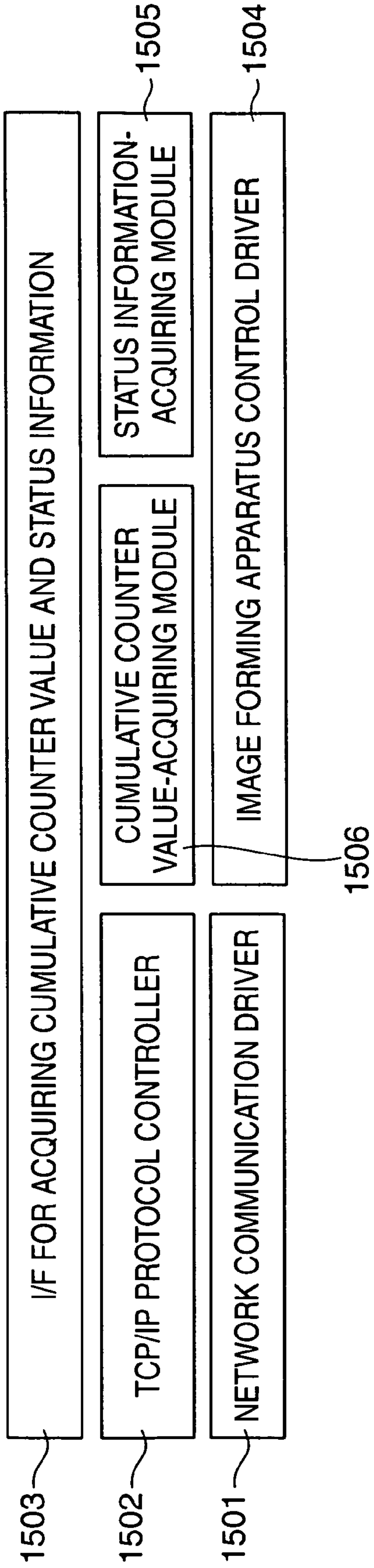
FIG. 15 is a block diagram showing the software configuration of image forming apparatuses appearing in FIG. 13.

FIG. 15 is a diagram showing the software configuration of each of the image forming apparatuses in the present embodiment.

In FIG. 15, reference numeral 1501 designates a network communication driver that controls a network interface. Reference numeral 1502 designates a TCP/IP protocol controller that controls the overall TCP/IP communication. Reference numeral 1503 designates an I/F that acquires a cumulative counter value and status information via the network.

Reference numeral 1504 designates a control driver of the image forming apparatus. The control driver 1504 controls the scanner controller 201, the engine controller 206, etc. Reference numeral 1505 designates a status information-acquiring module that collects status information from the scanner controller 201, the engine controller 206, etc. Reference numeral 1506 designates a cumulative counter value-acquiring module that collects cumulative counter information from the scanner controller 201, the engine controller 206, etc.

Next, a description will be given of a retransmission process executed by the information processing apparatuses when the information collecting server goes down.

In the present embodiment, when the information collecting server 1241 goes down, the information processing apparatuses 1214, 1224, and 1234 try retransmission. The flow of the present process is the same as that of the retransmission process in the first embodiment, and therefore the present process can be executed based on the process flow shown in FIGS. 6 and 7.

In the following, an example of the retransmission process in the present embodiment will be described.

Figure 16A:
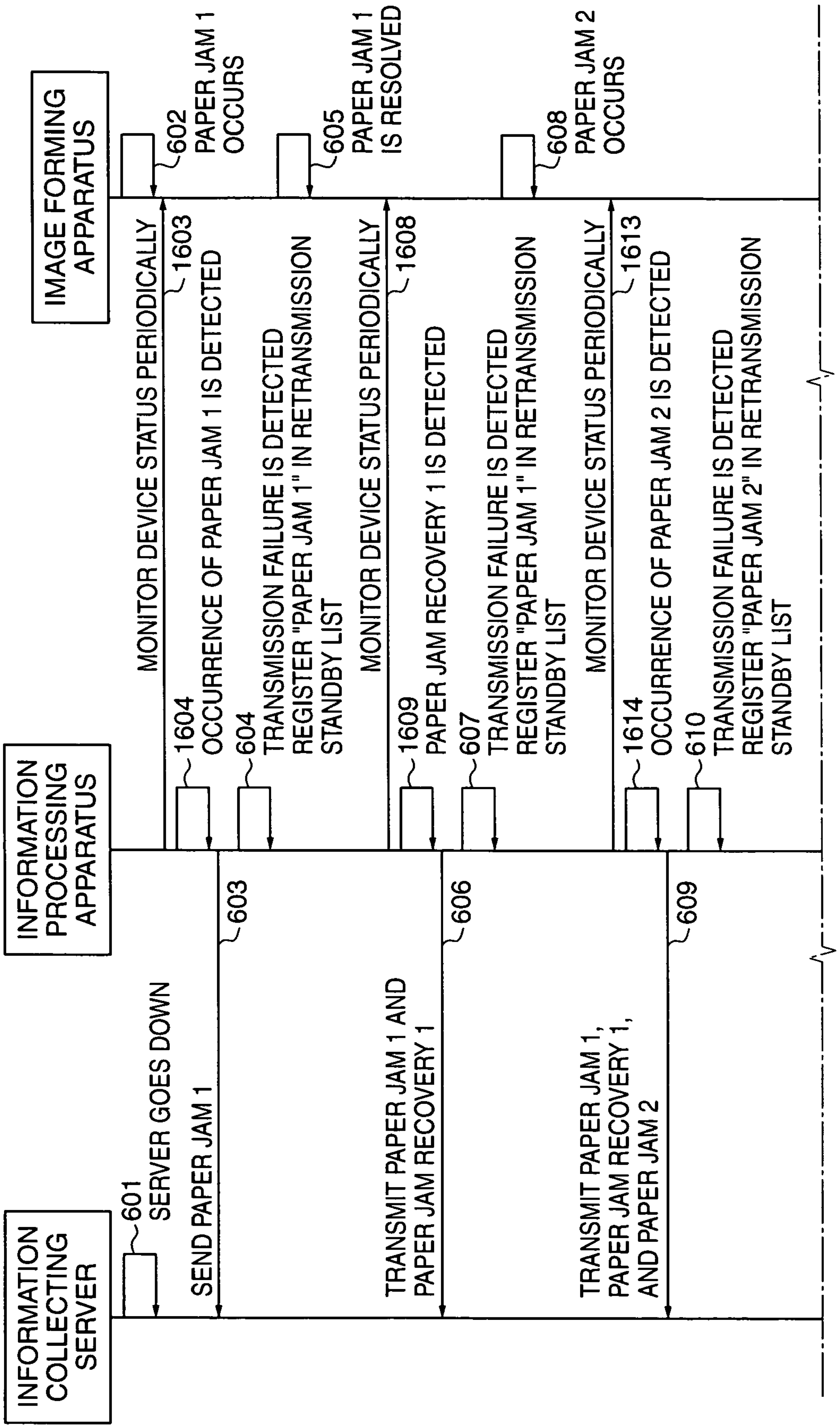
FIGS. 16A and 16B are sequence diagrams showing, by way of example, details of a retransmission process executed by the information processing apparatuses.
Figure 16B:
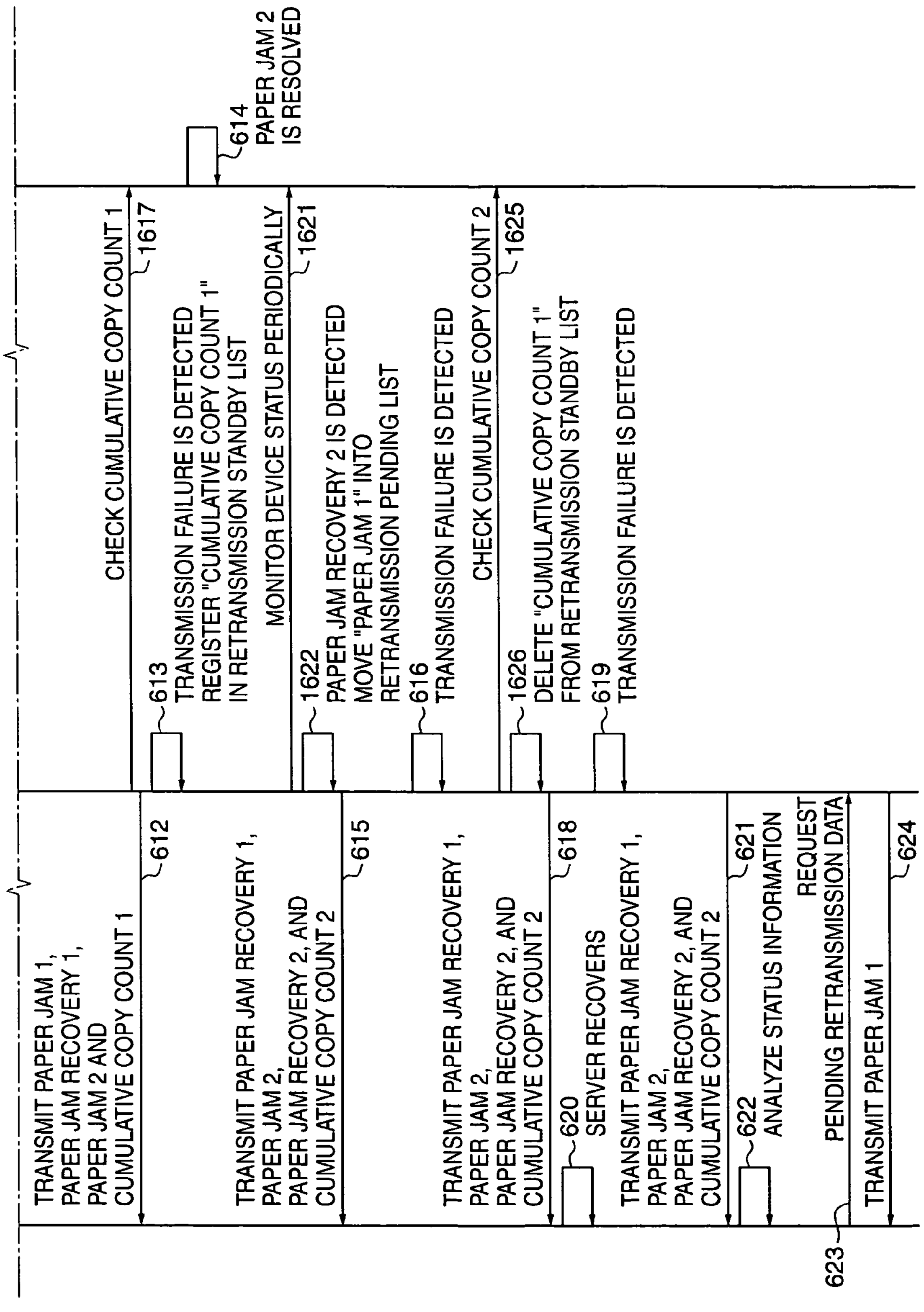

FIGS. 16A and 16B are sequence diagrams showing, by way of example, details of the retransmission process executed by each of the information processing apparatuses 1214, 1224, and 1234. This sequence shows the retransmission process executed by one of the information processing apparatuses 1214, 1224, and 1234 monitoring the image forming apparatuses 1211 to 1213, 1221 to 1223, and 1231 to 1233, respectively, when the information processing apparatus tries transmission of status information, such as information of a paper jam, or a cumulative counter value indicative of a copy count or the like as a message to the information collecting server 1241, but the transmission fails due to the down of the information collecting server 1241.

In FIGS. 16A and 16B, elements identical to those in FIGS. 8A and 8B are designated by identical reference numerals, and description thereof is omitted. In actuality, a single information processing apparatus monitors a plurality of image forming apparatuses, but in FIG. 16A, there are shown a single information collecting server, a single information processing apparatus, and a single image forming apparatus, for simplicity.

In the present embodiment, the information processing apparatus periodically polls the image forming apparatuses to be monitored, to thereby acquire status information and cumulative counter information (status information is acquired in events 1603, 1608, 1613, and 1621, and cumulative counter information in events 1617 and 1625). The information processing apparatus tries transmission of status information to the information collecting server 1241 as needed when a change in the status of any of the image forming apparatuses is detected (events 1604, 1609, 1614, and 1622), but tries transmission of a cumulative counter value to the same immediately after the cumulative counter value is acquired.

When connection to the information collecting server 1241 for transmission of each piece of status information or each cumulative counter value fails, processing for registration of a standby retransmission message, registration of a pending retransmission message, or deletion of a message is carried out based on the process flow in FIGS. 6 and 7. In the illustrated example, an information piece "paper jam 1" is moved into the retransmission pending list in an event 1622, and an information piece "cumulative copy count 1" is deleted from the retransmission standby list in an event 1626, whereby, in an event 621, an increase in the amount of message data to be transmitted immediately after recovery of the information collecting server in the event 620 is suppressed.

After recovery, the information collecting server 1241 analyzes status information in an event 622. When it is determined through the analysis that there remains an untransmitted status information piece in the information processing apparatus and the information piece is necessary for grasping the status of the image forming apparatus to be monitored, the information collecting server 1241 requests retransmission of the pending transmission data in an event 623. In the illustrated example, during the analysis in the event 622, the data of the event 602 is set pending for retransmission. At this time point, recovery from the paper jam has already occurred, but when and where the paper jam occurred has not been notified yet. Not until an event 624 can the information collecting server 1241 understand how the paper jam occurred.

The two-step transmission is performed as described above. As a result, it is possible to achieve the search for an image forming apparatus monitored and requiring an urgent service, the grasping of statuses of the apparatus in time sequence, and reduction of traffic.

According to the above described first and second embodiments, it is possible to avoid the information collecting server (management server) from performing processing more than necessary, by notifying the management server of only necessary information for the management server to perform its proper maintenance function, as information on the maintenance of the image forming apparatus after recovery of the management server.

More specifically, the image forming apparatus sends cumulative counter information (operation status) holding a cumulative copy count, and status information concerning the amount of residual toner, a paper jam, and so forth, to an information collecting server of a sales company, and the sales company utilizes the information to provide maintenance services or carry out charging processing. Information to be sent to the information collecting server includes the two types of information, i.e. the cumulative counter information and the status information, as described above, and the difference between the two types needs heeding. That is, the cumulative counter information has the characteristic of a cumulative value, and the cumulative updated value has only to be acquired once at the end of a certain counting period. A cumulative copy counter value used for preparing a used sheet count notification to a customer has only to be acquired once per day at a predetermined time and transmitted. This also applies to other types of counter values.

On the other hand, the status information concerning the amount of residual toner, a paper jam, and so forth is indispensable for providing maintenance support to a customer, and hence the status information has to be sent to the information collecting server promptly when a status change occurs. If paper jamming frequently occurs in a specific portion within an image forming apparatus, it can be considered that some abnormality has occurred in parts associated with the portion. Further, if an image forming apparatus has not recovered for a long time after transmission of status information indicative of occurrence of a paper jam, it can be considered that a trouble which the user cannot cope with has occurred. These two cases both require services of a service person. On the other hand, if a notification of recovery arrives immediately after transmission of the status information indicative of occurrence of the paper jam, it is judged that the user was able to cope with the trouble.

In the above-described way, the status information can be utilized effectively only by carrying out analysis processing on the status information based on time-series changes (in frequency or pattern). More specifically, in both of the above described embodiments, when data transmission from a sender is stopped due to a trouble with the information collecting server or a communication path, it is possible to reduce reception processing to be executed by the information collecting server, by eliminating unnecessary traffic while realizing transmission of useful data required by the information collecting server.

In particular, the use of the SOAP/XML i.e. the SOAP/XML format in communication with the information collecting server in the first and second embodiments, requires a database of a capacity larger than when cumulative counter information is transmitted as binary data. More specifically, as shown in FIG. 9 illustrating, by way of example, an excerpt of a paper jam information (status information) notification, and FIG. 10 illustrating, by way of example, an excerpt of a cumulative counter information notification, the SOAP/XML format requires name spaces and type information, which makes the amount of data approximately 20 times as large as that of data in a CVS format. In short, a message size of approximately 15 to 20 Kbytes is required for a single transmission.

When the information collecting server goes down for some cause, messages are stored in the image forming apparatuses associated therewith. If ten messages are kept on standby for transmission, the total size of the stored messages per each image forming apparatus may exceed 200 Kbytes, depending on the contents of the messages. For this reason, immediately after recovery from the down, the information collecting server has to receive and process data of more than 200 Kbytes from each of more than fifty thousand clients (image forming apparatuses). Therefore, it is desirable not only to avoid concentration of transmissions in the same time zone immediately after recovery of the information collecting server, but also to make pending transmission of messages which may have lost their values due to failure in transmitting them within a predetermined time period.

In the above described first and second embodiments, in the retransmission process executed by each client immediately after recovery of the information collecting server, in view of the characteristic of the cumulative counter value and that of the status information, only the latest one of cumulative counter values is selected, and status information whose time series changes are to be tracked are narrowed down to several latest status information pieces (e.g. latest three), to thereby reduce the data amount of the SOAP/XML messages for retransmission. Further, status information pieces set pending for retransmission immediately after recovery of the information collecting server are held by the client over a predetermined time period so that the status information pieces can be transmitted only when a retransmission request is received from the information collecting server. This makes it possible to effectively send only information required by the information collecting server, while reducing the amount of traffic.

The present invention is not limited to the above described embodiments, but can be modified in various manners based on the subject matter of the present invention, which should not be excluded from within the scope of the present invention insofar as functions as recited in the appended claims or the functions performed by the construction of either of the above described embodiments can be achieved. Further, the present invention may either be applied to a system composed of a plurality of apparatuses or to a single apparatus.

Further, it is to be understood that the object of the present invention may also be accomplished by supplying a system or an apparatus with a storage medium in which a program code of software, which realizes the functions of either of the above described embodiments is stored, and causing a computer (or CPU or MPU) of the system or apparatus to read out and execute the program code stored in the storage medium.

In this case, the program code itself read from the storage medium realizes the functions of either of the above described embodiments, and therefore the program code and the storage medium in which the program code is stored constitute the present invention.

Examples of the storage medium for supplying the program code include a floppy (registered trademark) disk, a hard disk, a magnetic-optical disk, a CD-ROM, a CD-R, a CD-RW, a DVD-ROM, a DVD-RAM, a DVD-RW, a DVD+RW, a magnetic tape, a nonvolatile memory card, and a ROM. Alternatively, the program may be downloaded via a network from another computer, a database, or the like, not shown, connected to the Internet, a commercial network, a local area network, or the like.

Further, it is to be understood that the functions of either of the above described embodiments may be accomplished not only by executing the program code read out by a computer, but also by causing an OS (operating system) or the like which operates on the computer to perform a part or all of the actual operations based on instructions of the program code.

Further, it is to be understood that the functions of either of the above described embodiments may be accomplished by writing a program code read out from the storage medium into a memory provided on an expansion board inserted into a computer or a memory provided in an expansion unit connected to the computer and then causing a CPU or the like provided in the expansion board or the expansion unit to perform a part or all of the actual operations based on instructions of the program code.

This application claims priority from Japanese Patent Application No. 2004-231659 filed Aug. 6, 2004, which is hereby incorporated by reference herein.

What is claimed is:

1. An information processing system comprising a plurality of information processing apparatuses connectable to a management server via a communication network, each of the plurality of information processing apparatuses comprising:

a communication device that notifies a plurality of first maintenance information and second maintenance information on at least one image forming apparatus to the management server, wherein the plurality of first maintenance information are indicative of a status of the image forming apparatus and the second maintenance information is counter information including an output face count in the image forming apparatus;

a storage device that stores the plurality of first maintenance information and the second maintenance information during a failure in communication with the management server; and a control device that is operable, in the timing when the failure in communication has been recovered, to cause said communication device to notify the management server of only part of the plurality of first maintenance information, which is collected and stored in the storage device during the failure in communication, without notifying the management server of the rest of the plurality of first maintenance information in the storage device, and to notify the management server of the second maintenance information, which is newly collected and stored in the storage device, even if the second maintenance information is generated in a plurality of timings, during the failure in communication.

2. An information processing system as claimed in claim 1, wherein each of the plurality of information processing apparatuses further comprises a registration control device that registers the second maintenance information in a transmission queue in a manner such that transmission of the second maintenance information is prioritized over transmission of the plurality of first maintenance information.

3. An information processing system as claimed in claim 1, wherein said control device is responsive to a request from the management server for an additional notification of the plurality of first maintenance information, for causing said communication device to notify the plurality of first maintenance information which have not been transmitted yet, to the management server.

4. An information processing system as claimed in claim 1, wherein said control device is responsive to a request from the management server for a notification of the plurality of first maintenance information and the second maintenance information, for notifying the plurality of first maintenance information and the second maintenance information to the management server according to SOAP (Simple Object Access Protocol).

5. An information processing system as claimed in claim 1, wherein the second maintenance information includes counter information indicative of a counter value counted up whenever a predetermined time period elapses without a predetermined function being used.

6. An information processing system as claimed in claim 1, further comprising the image forming apparatus, which records an image on a recording medium.

7. A notification method for each of a plurality of information processing apparatuses connectable to a management server via a communication network, each of the plurality of information processing apparatuses including a communication device that notifies a plurality of first maintenance information and second maintenance information on at least one image forming apparatus to the management server, wherein the plurality of first maintenance information are indicative of a status of the image forming apparatus and the second maintenance information is counter information including an output face count in the image forming apparatus, each of the plurality of information processing apparatuses carrying out the method comprising:

a storage step of storing the plurality of first maintenance information and the second maintenance information in a storage device during a failure in communication with the management server; and a control step of causing, in the timing upon recovery from the failure in communication, the communication device to notify the management server of only part of the plurality of first maintenance information, which is collected and stored in the storage device during the failure in communication, without notifying the management server of the rest of the plurality of first maintenance information in the storage device, and to notify the management server of the second maintenance information, which is newly collected and stored in the storage device, even if the second maintenance information is generated in a plurality of timings during the failure in communication.

8. A notification method as claimed in claim 7, further comprising a registration control step of registering the second maintenance information in a transmission queue in a manner such that transmission of the second maintenance information is prioritized over transmission of the plurality of first maintenance information.

9. A storage medium storing a computer program for each of a plurality of information processing apparatuses connectable to a management server via a communication network, each of the plurality of information processing apparatuses including a communication device that notifies a plurality of first maintenance information and second maintenance information on at least one image forming apparatus to the management server, wherein the plurality of first maintenance information are indicative of a status of the image forming apparatus and the second maintenance information is counter information including an output face count in the image forming apparatus, the computer program being executable by each of the plurality of information processing apparatuses for carrying out the method comprising:

a storage step of storing the plurality of first maintenance information and the second maintenance information in a storage device during a failure in communication with the management server; and a control step of causing, in the timing upon recovery from the failure in communication, the communication device to notify the management server of only part of the plurality of first maintenance information, which is collected and stored in the storage device during the failure in communication, without notifying the management server of the rest of the plurality of first maintenance information the storage device, and to notify the management server of the second maintenance information, which is newly collected and stored in the storage device, even if the second maintenance information is generated in a plurality of timings during the failure in communication.

10. A storage medium storing a computer program for each of a plurality of information processing apparatuses connectable to a management server via a communication network, each of the plurality of information processing apparatuses including a communication device that notifies a plurality of first maintenance information and second maintenance information on at least one image forming apparatus to the management server, wherein the plurality of first maintenance information are indicative of a status of the image forming apparatus and the second maintenance information is counter information including an output face count in the image forming apparatus, the computer program being executable by each of the plurality of information processing apparatuses and comprising:

a storage module for storing the plurality of first maintenance information and the second maintenance information in a storage device during a failure in communication with the management server; and a control module for causing, in the timing upon recovery from the failure in communication, the communication device to notify the management server of only part of the plurality of first maintenance information, which is collected and stored in the storage device during the failure in communication, without notifying the management server of the rest of the plurality of first maintenance information the storage device, and to notify the management server of the second maintenance information, which is newly collected and stored in the storage device, even if the second maintenance information is generated in a plurality of timings during the failure in communication.

* * * * *